(12) United States Patent
Unoki et al.

(10) Patent No.: US 8,298,697 B2
(45) Date of Patent: Oct. 30, 2012

(54) MEA MEMBER AND POLYMER ELECTROLYTE FUEL CELL

(75) Inventors: Shigeyuki Unoki, Osaka (JP); Takashi Nakagawa, Osaka (JP); Takashi Morimoto, Osaka (JP); Mitsuo Yoshimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 12/674,843

(22) PCT Filed: May 28, 2009

(86) PCT No.: PCT/JP2009/002356
§ 371 (c)(1),
(2), (4) Date: Feb. 23, 2010

(87) PCT Pub. No.: WO2009/144940
PCT Pub. Date: Mar. 12, 2009

(65) Prior Publication Data
US 2011/0143252 A1 Jun. 16, 2011

(30) Foreign Application Priority Data

May 30, 2008 (JP) .................. 2008-142455

(51) Int. Cl.
H01M 8/04 (2006.01)
H01M 2/10 (2006.01)
H01M 1/08 (2006.01)
H01M 8/10 (2006.01)

(52) U.S. Cl. ........ 429/100; 429/463; 429/507; 429/508; 429/511

(58) Field of Classification Search .................. 429/507, 429/100, 463, 508, 511
See application file for complete search history.

(56) References Cited

U.S. PATENT DOCUMENTS

| 5,464,700 | A | 11/1995 | Steck et al. | |
|---|---|---|---|---|
| 2007/0134536 | A1* | 6/2007 | Takase et al. | 429/35 |
| 2007/0264557 | A1 | 11/2007 | Kobayashi et al. | |
| 2009/0136811 | A1 | 5/2009 | Kusakabe et al. | |

FOREIGN PATENT DOCUMENTS

| EP | 2 071 656 A1 | 6/2009 |
|---|---|---|
| JP | 7-501417 | 2/1995 |
| JP | 2002-093434 | 3/2002 |

(Continued)

Primary Examiner — Yogendra Gupta
Assistant Examiner — Jeremiah Smith
(74) Attorney, Agent, or Firm — McDermott Will & Emery LLP

(57) ABSTRACT

In an MEA member constituted by a polymer electrolyte membrane-electrode assembly (MEA) and a frame and in a polymer electrolyte fuel cell including this MEA member, the MEA and the frame can be easily separated from each other without using any special tool. An MEA member 7 includes an MEA 5 and a plate-shaped resin frame 6, and a separating portion for separating the MEA 5 from the frame 6 is formed in the MEA member 7. The MEA 5 includes a polymer electrolyte membrane 2 and a pair of electrodes 3 and 4 respectively disposed on both main surfaces of the polymer electrolyte membrane 2. The frame 6 sandwiches and holds a peripheral portion of main surfaces of the MEA 5 such that the MEA 5 is located inside the frame. The separating portion is a broken-line cutoff line 50 formed on the frame 6 to divide the frame 6 into two or more parts or a partial sandwiching portion 55 located at an inner peripheral portion of the frame 6 to partially sandwich the peripheral portion of the MEA 5.

9 Claims, 17 Drawing Sheets

FOREIGN PATENT DOCUMENTS

| | | |
|---|---|---|
| JP | 2005-209479 | 8/2005 |
| JP | 2006-120520 | 5/2006 |
| JP | 2006-310288 | 11/2006 |
| JP | 2008-235159 | 10/2008 |
| WO | WO 2006/040994 | 4/2006 |
| WO | WO 2009/047908 A1 | 4/2009 |

* cited by examiner

MEA MEMBER AND POLYMER ELECTROLYTE FUEL CELL

RELATED APPLICATIONS

This application is the U.S. National Phase under 35 U.S.C. §371 of International Application No. PCT/JP2009/002356, filed on May 28, 2009, which in turn claims the benefit of Japanese Application No. 2008-142455, filed on May 30, 2008, the disclosures of which Applications are incorporated by reference herein.

TECHNICAL FIELD

The present invention relates to a technology for, in an MEA member constituted by a polymer electrolyte membrane-electrode assembly (MEA) and a frame and in a polymer electrolyte fuel cell including the MEA member, separating the MEA and the frame from each other and recovering the MEA and the frame to recycle electrode materials and the like.

BACKGROUND ART

Known as one example of a fuel cell which has been attracting attention as a clean energy source in recent years is a polymer electrolyte fuel cell (hereinafter referred to as a "PEFC (Polymer Electrolyte Fuel Cell)"). In the PEFC, a solid polymer membrane having ionic conductivity is used as a polymer electrolyte. Used as the polymer electrolyte membrane is, for example, a polystyrene-based positive ion-exchange membrane containing a sulfonic acid group, an electrolyte membrane formed by a mixture of a fluorocarbon sulfonic acid and polyvinylidene fluoride, or a perfluoro carbon sulfonic acid membrane.

FIG. 26 is a schematic diagram showing a power generating system using the polymer electrolyte fuel cell. For example, as shown in FIG. 26, a cell stack 99 of the PEFC includes a plurality of single cells 10 each of which is a basic unit and which are stacked, and these single cells 10 are connected to one another in series. Each single cell 10 includes: an anode separator 9 on which a fuel gas channel is formed; a membrane-electrode assembly 5 (hereinafter referred to as "MEA (Membrane Electrode Assembly)") formed such that the polymer electrolyte membrane is sandwiched between a pair of electrodes that are an anode and a cathode; and a cathode separator 8 on which an oxidizing gas channel is formed. The anode separator 9, the MEA 5, and the cathode separator 8 are stacked in this order.

In the PEFC, when a hydrogen-containing fuel is supplied through the fuel gas channel to the anode, and an oxygen-containing oxidizing agent is supplied through the oxidizing gas channel to the cathode, the fuel and the oxidizing agent react with each other in the anode and the cathode to generate electricity and heat.

In the above PEFC, the MEA 5 is in the form of a thin film. When assembling the cell stack 99, each MEA 5 is difficult to handle. Here, as described in PTL 1 for example, an "MEA member 7" including a frame 6 surrounding the MEA 5 is formed so as to be able to be handled as a single unit, and the handleability of the MEA 5 is improved. A gasket is disposed on the frame to seal between the frame and the anode separator and between the frame and the cathode separator to prevent the fuel gas, the oxidizing gas, and the cooling water from leaking.

CITATION LIST

Patent Literature

PTL 1: Japanese Laid-Open Patent Application Publication No. 2006-310288

SUMMARY OF INVENTION

Technical Problem

A precious metal, such as platinum, is used for the electrode of the MEA. Therefore, the precious metal contained in the electrode should be recovered and recycled when discarding the MEA. As described in PTL 1, in the MEA member, since a peripheral portion of the MEA is sandwiched by the frame, the MEA is held inside the frame. Here, since the MEA is sandwiched by the frames at appropriate pressure, it is difficult to detach only the MEA from the frame. If the MEA is forcedly detached, the MEA may tear. Therefore, in order to separate the MEA from the frame, a tool for breaking down the frame without damaging the MEA becomes necessary.

The present invention was made to solve the above problems, and an object of the present invention is to provide the structure of the MEA member configured such that the MEA and the frame can be easily separated from each other without using any special tool or damaging the MEA.

Solution to Problem

An MEA member of the present invention includes: an MEA including a polymer electrolyte membrane and a pair of electrodes respectively disposed on both main surfaces of the polymer electrolyte membrane; a plate-shaped resin frame configured to sandwich and hold a peripheral portion of main surfaces of the MEA from both sides of the MEA such that the MEA is located inside the frame; and a separating portion configured to separate the MEA from the frame, wherein the separating portion is a broken-line cutoff line formed on the frame to divide the frame into two or more parts or is a partial sandwiching portion located at an inner peripheral portion of the frame to partially sandwich the peripheral portion of the MEA.

Moreover, a polymer electrolyte fuel cell of the present invention includes the MEA member and a pair of separators respectively stacked on both surfaces of the MEA member so as to sandwich the MEA member, a reaction gas channel being formed on a region of each of the separators which region contacts the electrode.

In the MEA member and the polymer electrolyte fuel cell configured as above, in a case where the separating portion is the cutoff line, a part of the frame can be cut off or broken down along the cutoff line by holding and pulling the part of the frame. In contrast, in a case where the separating portion is the partial sandwiching portion, the area of a sandwiched portion of the MEA decreases as compared to before. With this, a power applied from the frame to the MEA to sandwich the MEA decreases. On this account, the MEA is easily taken out from the frame. Thus, the MEA and the frame can be easily separated from each other without using any special tool or damaging the MEA.

It is preferable that in a case where the separating portion is the cutoff line, the frame include a manifold hole penetrating therethrough in a thickness direction of the polymer electrolyte membrane, a manifold hole gasket disposed on the frame to surround the manifold hole, and an electrode gasket disposed on the frame to surround the electrode, and when viewed from the thickness direction of the polymer electrolyte membrane, the cutoff line be formed on a portion of the frame at which portion the electrode gasket is formed or on an outer peripheral side of this portion, and at the same time, is formed on a portion of the frame at which portion the manifold hole gasket is formed or on an inner peripheral side of this portion.

With this, in a case where a part of the frame is cut off or broken down by utilizing the cutoff line, the power of sandwiching the MEA efficiently decreases, and the MEA can be taken out more easily.

Moreover, it is preferable that when viewed from the thickness direction of the polymer electrolyte membrane, the cutoff line be constituted by a plurality of slits which are formed at a portion of the frame at which portion the frame and the peripheral portion of the MEA overlap each other and each of which reaches the peripheral portion of the MEA.

With this, since a portion of the frame which portion sandwiches the MEA can be cut off or broken down by utilizing the cutoff line, the power of sandwiching the MEA efficiently decreases, and the MEA can be taken out more easily.

In the MEA member, at least a part of the plurality of slits may be filled up with the electrode gasket or the manifold hole gasket.

With this, a part of the gasket gets in the slits forming the cutoff line, so that the adherence between the frame and the gasket improves. Moreover, the cutoff line can be utilized as grooves for disposing the gasket on the frame.

In the MEA member, the plurality of slits may be alternately and consecutively formed on a first main surface and a second main surface of the frame. Or, the plurality of slits may be formed on one of a first main surface and a second main surface of the frame. Or, the plurality of slits may be formed on both a first main surface and a second main surface of the frame such that the slit on the first main surface and the slit on the second main surface are opposed to each other with the peripheral portion of the MEA interposed therebetween.

Moreover, in the MEA member, the polymer electrolyte membrane may be exposed at the peripheral portion of the MEA, and the frame and the polymer electrolyte membrane may contact each other the peripheral portion of the MEA. Or, a membrane reinforcing member may be disposed at a peripheral portion of the polymer electrolyte membrane, and the frame and the membrane reinforcing member may contact each other at the peripheral portion of the MEA.

Moreover, in the MEA member, in a case where the separating portion is the partial sandwiching portion, the partial sandwiching portion may include first projections each partially projecting inwardly from the inner peripheral portion of the frame and second projections each partially projecting inwardly from the inner peripheral portion of the frame, and the peripheral portion of the MEA may be sandwiched between the first projections and the second projections.

Moreover, in the MEA member, a plurality of the first projections may be continuously formed at predetermined intervals, a plurality of the second projections may be continuously formed at predetermined intervals, and the first projections and the second projections may be alternately provided in a circumferential direction of the frame.

With this, the peripheral portion of the MEA is equally sandwiched while decreasing the area of the sandwiched portion of the MEA.

Moreover, an entire inner peripheral portion of at least one of main surfaces of the frame may be covered with a thin film. Since the thin film can be easily detached, the MEA is strongly sandwiched while in use, and the MEA and the frame can be easily separated from each other.

Advantageous Effects of Invention

The present invention has the following effects.

In accordance with the present invention, in a case where the separating portion is the cutoff line, a part of the frame can be cut off or broken down along the cutoff line by holding and pulling the part of the frame. In a case where the part of the frame is broken down, the power applied from the frame to the MEA to sandwich the MEA decreases, and the MEA can be easily taken out from the frame. Moreover, in a case where the separating portion is the partial sandwiching portion, the area of the sandwiched portion of the MEA can be decreased. Therefore, the power of sandwiching the MEA decreases, and the MEA can be easily taken out from the frame. Therefore, the MEA and the frame can be easily separated from each other without using any special tool or damaging the MEA.

DESCRIPTION OF EMBODIMENTS

Figure 1:
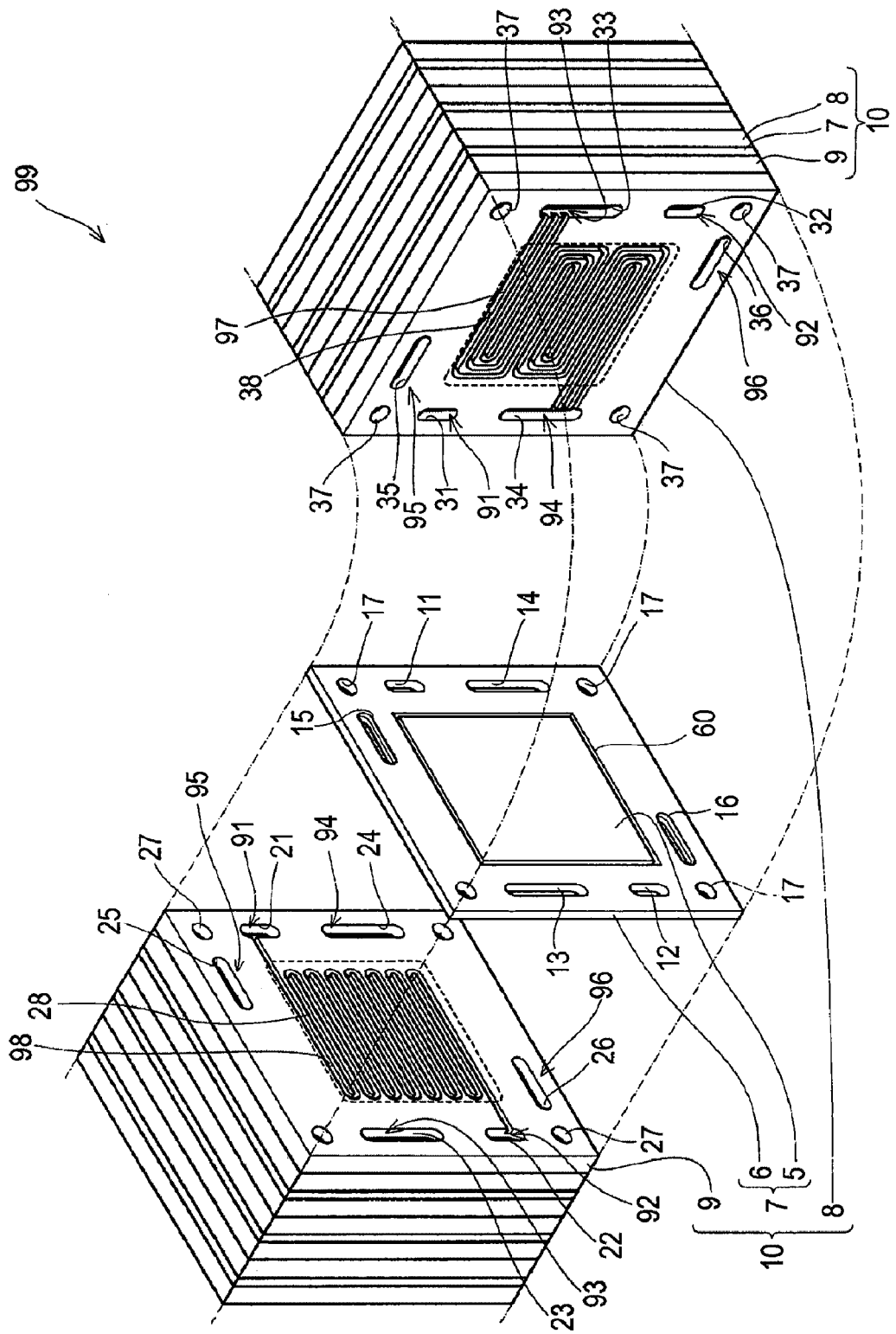
FIG. 1 is a partially exploded perspective view schematically showing the structure of a polymer electrolyte fuel cell according to Embodiment of the present invention.

Hereinafter, preferred embodiments of the present invention will be explained in reference to the drawings. In the drawings, the same reference signs are used for the same or corresponding components, and a repetition of the same explanation is avoided.

Embodiment 1

A framed membrane-electrode assembly and a polymer electrolyte fuel cell according to Embodiment 1 of the present invention will be explained. Hereinafter, the membrane-electrode assembly is referred to as "MEA", the framed membrane-electrode assembly is referred to as "MEA member", and a polymer electrolyte fuel cell is referred to as "PEFC".

Configuration of PEFC

Figure 2:
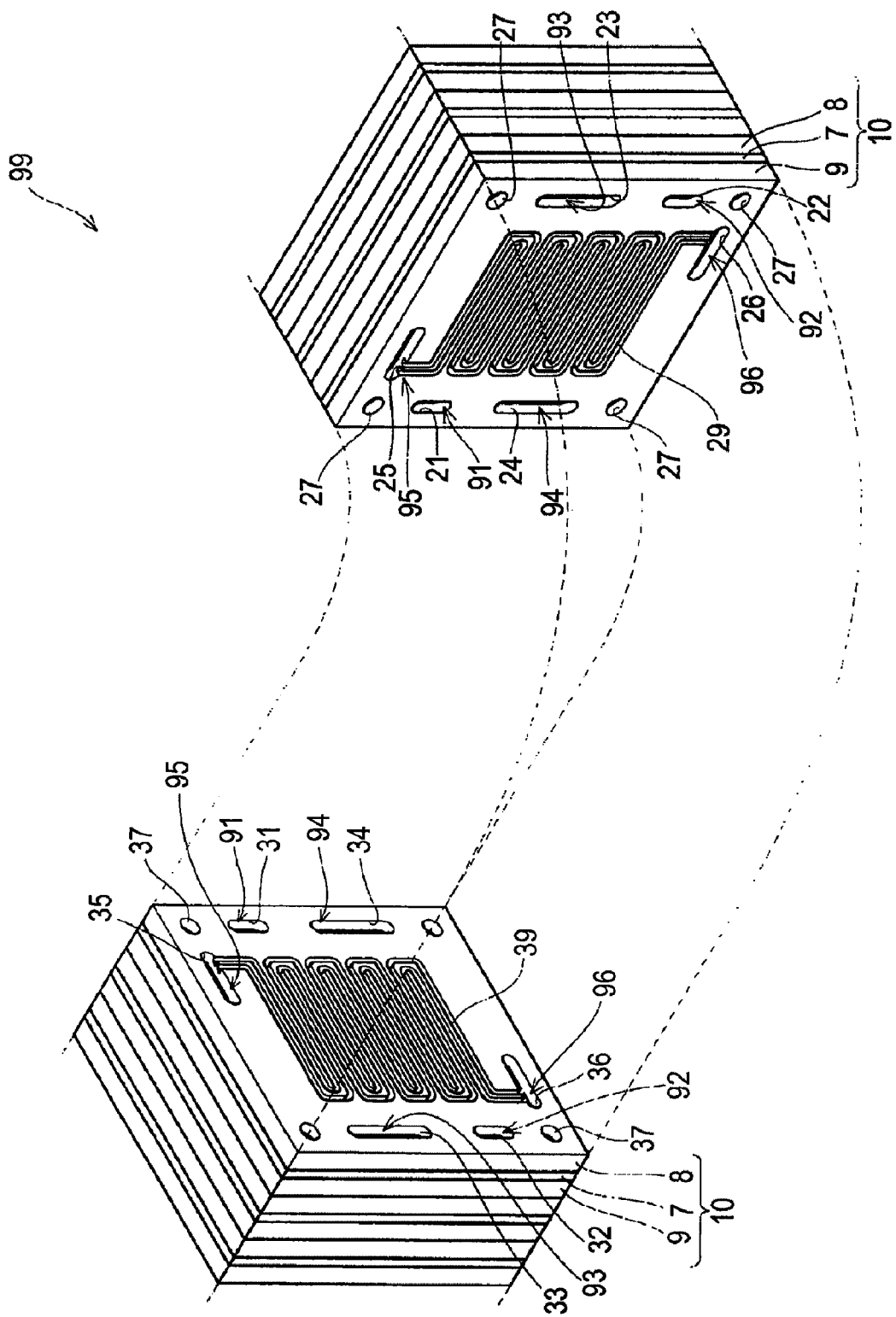
FIG. 2 is a partially exploded perspective view showing the structure of a cooling water supplying passage formed between separators in the polymer electrolyte fuel cell.
Figure 26:
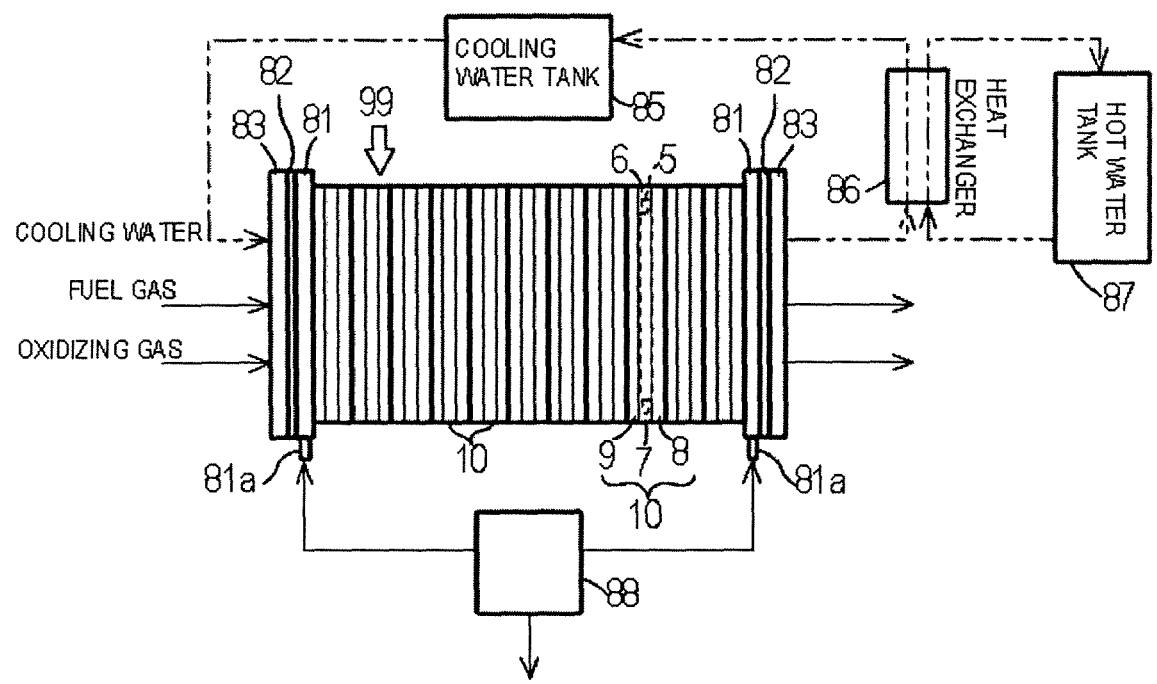
FIG. 26 is a schematic diagram showing a power generating system using the polymer electrolyte fuel cell.

First, the configuration of the PEFC will be explained. FIG. 1 is a partially exploded perspective view schematically showing the structure of a polymer electrolyte fuel cell according to Embodiment of the present invention. FIG. 2 is a partially exploded perspective view showing the structure of a cooling water supplying passage formed between separators in the polymer electrolyte fuel cell. FIG. 26 is a schematic diagram showing a power generating system using the polymer electrolyte fuel cell.

As shown in FIGS. 1, 2, and 26, the cell stack 99 of the PEFC includes a plurality of single cells 10 stacked in series to obtain high voltage. A current collector 81 having an electric output terminal 81a, an insulating plate 82, and an end plate 83 are stacked in this order on each of both sides of the assembly of the single cells 10 in the stack direction. This stack body is fastened using bolts and nuts (both of which are not shown) so as to be pressed by the end plates 83, respectively disposed on both end portions in the stack direction, in such a direction that the end plates 83 compress the stack body from both sides in the stack direction.

Single Cell 10

Here, the structure of the single cell 10 that is the basic unit of the cell stack 99 will be explained. The single cell 10 includes an MEA member 7 and a pair of separators. The pair of separators are the anode separator 9 and the cathode separator 8 which are respectively stacked on both main surfaces of the MEA member 7 so as to sandwich the MEA member 7.

Figure 3:
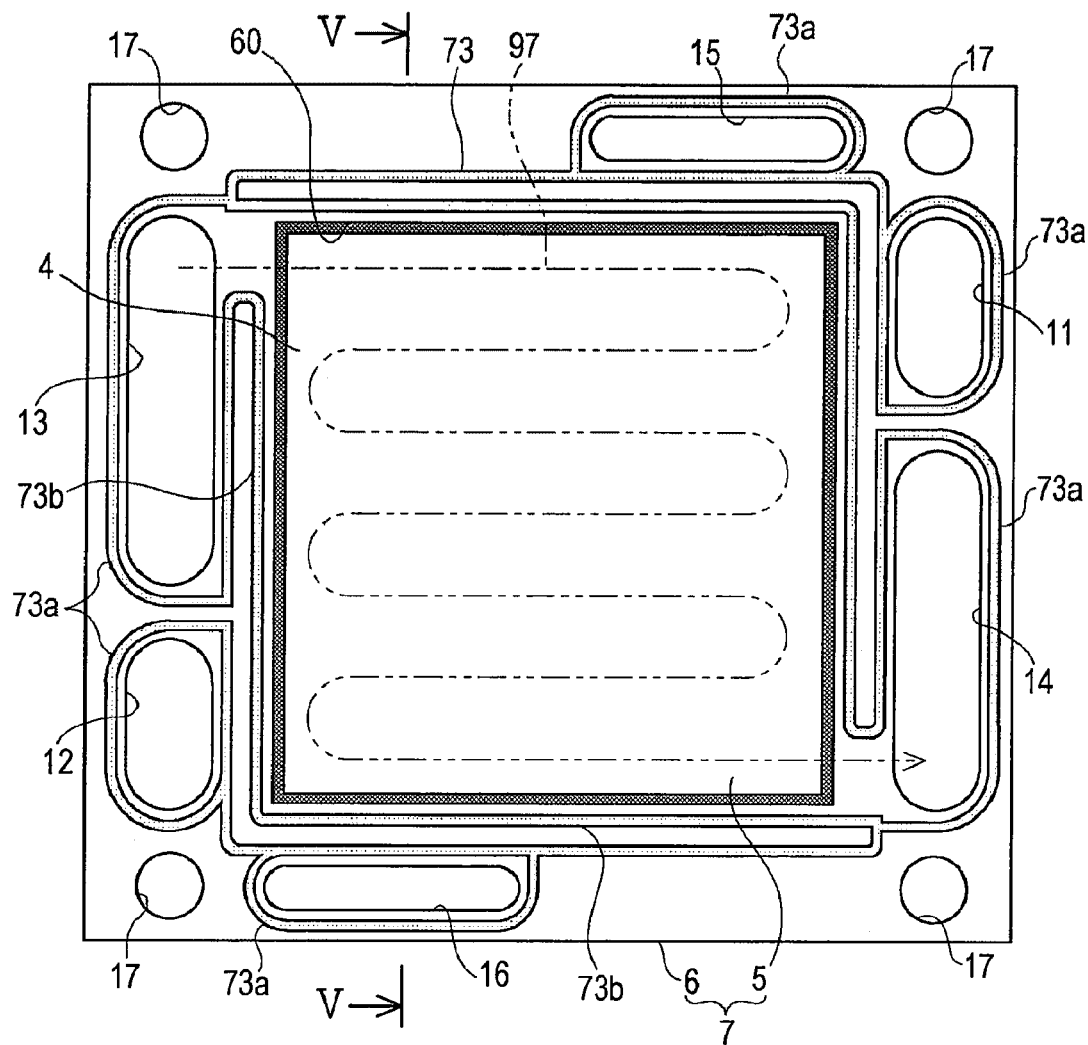
FIG. 3 is a diagram showing a main surface of the MEA member when viewed from a cathode side.
Figure 4:
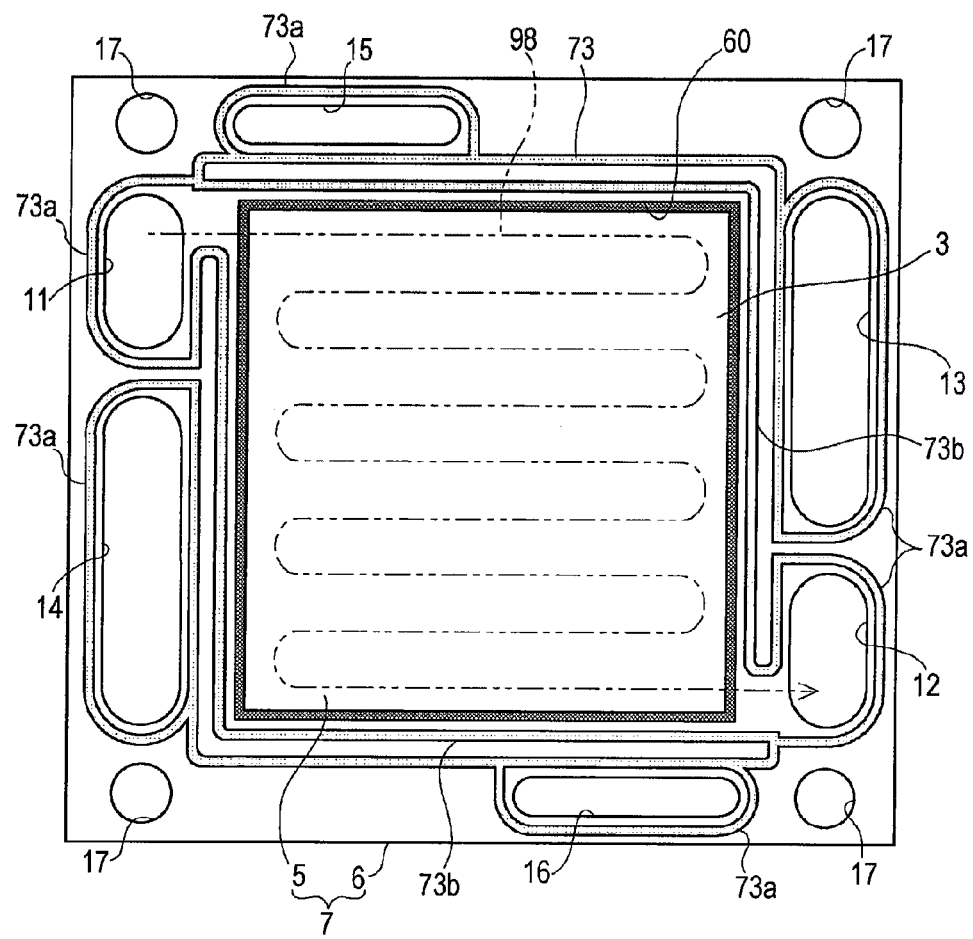
FIG. 4 is a diagram showing a main surface of the MEA member when viewed from an anode side.
Figure 5:
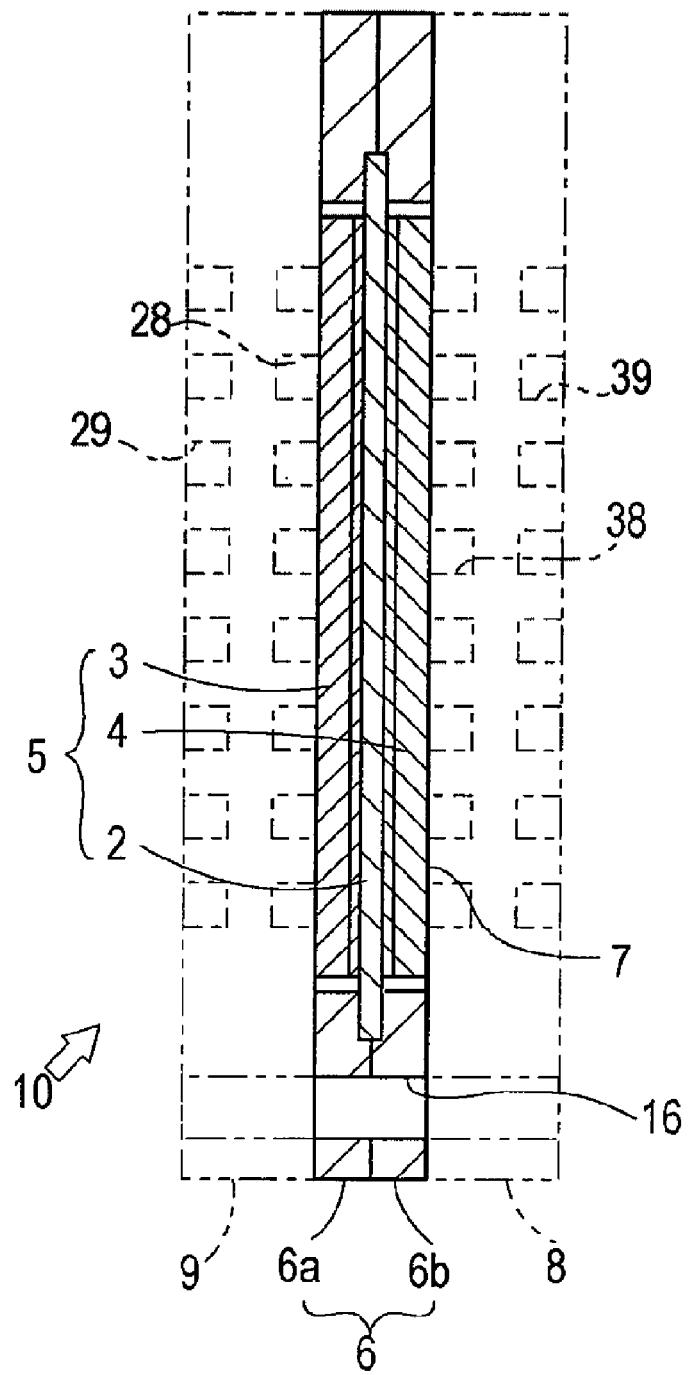
FIG. 5 is a cross-sectional view taken along line V-V of FIG. 3.

FIG. 3 is a diagram showing a main surface of the MEA member when viewed from a cathode side. FIG. 4 is a diagram showing a main surface of the MEA member when viewed from an anode side. FIG. 5 is a cross-sectional view taken along line V-V of FIG. 3. As shown in FIGS. 3 to 5, the MEA member 7 includes the MEA 5 and the plate-like frame 6. The MEA 5 includes a polymer electrolyte membrane 2 and a pair of electrodes 3 and 4. The pair of electrodes 3 and 4 are the anode 3 and the cathode 4 which are respectively stacked on both main surface of the polymer electrolyte membrane 2 except for a peripheral portion of the polymer electrolyte membrane 2. The plate-like frame 6 sandwiches the peripheral portion of the polymer electrolyte membrane 2 such that the electrode of the MEA 5 is arranged inside the frame. The anode 3 includes a catalyst layer 3a contacting the polymer electrolyte membrane 2 and a gas diffusion layer 3b covering the catalyst layer 3a. The cathode 4 includes a catalyst layer 4a contacting the polymer electrolyte membrane 2 and a gas diffusion layer 4b covering the catalyst layer 4a. The configuration of the MEA member 7 will be described later in detail.

Bolt holes 17, 27, and 37, fuel gas supplying manifold holes 11, 21, and 31, fuel gas discharging manifold holes 12, 22, and 32, oxidizing gas supplying manifold holes 13, 23, and 33, oxidizing gas discharging manifold holes 14, 24, and 34, cooling water supplying manifold holes 15, 25, and 35, and cooling water discharging manifold holes 16, 26, and 36 are formed on the frame 6 of the MEA member 7, the anode separator 9, and the cathode separator 8 so as to penetrate main surfaces of the frame 6 of the MEA member 7, the anode separator 9, and the cathode separator 8. The fuel gas supplying manifold holes 11, 21, and 31 are connected to one another in the cell stack 99 to form a fuel gas supplying manifold 91. The fuel gas discharging manifold holes 12, 22, and 32 are connected to one another in the cell stack 99 to form a fuel gas discharging manifold 92. The oxidizing gas supplying manifold holes 13, 23, and 33 are connected to one another in the cell stack 99 to form an oxidizing gas supplying manifold 93. The oxidizing gas discharging manifold holes 14, 24, and 34 are connected to one another in the cell stack 99 to form an oxidizing gas discharging manifold 94. The cooling water supplying manifold holes 15, 25, and 35 are connected to one another in the cell stack 99 to form a cooling water supplying manifold 95. The cooling water discharging manifold holes 16, 26, and 36 are connected to one another in the cell stack 99 to form a cooling water discharging manifold 96.

A fuel gas channel groove 28 extending to connect the fuel gas supplying manifold hole 21 and the fuel gas discharging manifold hole 12 is formed on a surface of the anode separator 9 which surface contacts the gas diffusion layer 3b of the anode 3 of the MEA 5. The fuel gas channel groove 28 is formed to have a serpentine shape on a substantially entire surface of the anode separator 9 which surface contacts the MEA 5. The fuel gas channel groove 28 forms a fuel gas channel 98 between the MEA member 7 and the anode separator 9 which are stacked on each other in the single cell 10. The fuel gas channel 98 connects the fuel gas supplying manifold hole 21 and the fuel gas discharging manifold hole 22.

An oxidizing gas channel groove 38 extending to connect the oxidizing gas supplying manifold hole 33 and the oxidizing gas discharging manifold hole 34 is formed on a surface of the cathode separator 8 which surface contacts the gas diffusion layer 4b of the cathode 4 of the MEA 5. The oxidizing gas channel groove 38 is formed to have a serpentine shape on a substantially entire surface of the cathode separator 8 which surface contacts the MEA 5. The oxidizing gas channel groove 38 forms an oxidizing gas channel 97 between the MEA member 7 and the cathode separator 8 which are stacked in the single cell 10. The oxidizing gas channel 97 connects the oxidizing gas supplying manifold hole 33 and the oxidizing gas discharging manifold hole 34.

As shown in FIG. 2, a cooling water channel groove 29 having a serpentine shape is formed on a surface of the anode separator 9 which surface contacts the cathode separator 8.

The cooling water channel groove 29 connects the cooling water supplying manifold hole 25 and the cooling water discharging manifold hole 26. A cooling water channel groove 39 having a serpentine shape is formed on a surface of the cathode separator 8 which surface contacts the anode separator 9. The cooling water channel groove 39 connects the cooling water supplying manifold hole 35 and the cooling water discharging manifold hole 36. These cooling water channel grooves 29 and 39 are located so as to be joined to each other in the cell stack 99. Thus, a cooling water channel connecting the cooling water supplying manifold hole 25 and the cooling water discharging manifold hole 26 is formed on a stack surface between the single cells 10, and a cooling water channel connecting the cooling water supplying manifold hole 35 and the cooling water discharging manifold hole 36 is formed on a stack surface between the single cells 10.

Each of the separators 8 and 9 may be made of a gas-impermeable electrically-conductive material. For example, a resin-impregnated carbon material having a predetermined shape or a product formed by a mixture of carbon powder and a resin material is generally used as each of the separators 8 and 9.

Operations of PEFC During Electric Power Generation

Here, the operations of the above PEFC during the electric power generation will be explained. As shown in FIG. 26, the hydrogen-containing fuel gas is supplied to the cell stack 99. The fuel gas is introduced to the fuel gas supplying manifold 91 and flows through the fuel gas channel 98 of the single cell 10 to be supplied to the anode 3 of the MEA 5. The surplus fuel gas is discharged through the fuel gas discharging manifold 92 to the outside of the cell stack 99. Moreover, the oxygen-containing oxidizing gas (herein, air) is supplied to the cell stack 99. The oxidizing gas is introduced to the oxidizing gas supplying manifold 93 and flows through the oxidizing gas channel 97 of the single cell 10 to be supplied to the cathode 4 of the MEA 5. The surplus oxidizing gas is discharged through the oxidizing gas discharging manifold 94 to the outside of the cell stack 99. Thus, the fuel gas and the oxidizing gas are supplied to the MEA 5 and electrochemically react with each other in the electrodes 3 and 4 to generate electricity, heat, and water.

The heat generated in the PEFC is recovered by the cooling water circulating through a cooling water tank 85, the cooling water supplying manifold 95 of the cell stack 99, the cooling water channel formed between the single cells 10, and the cooling water discharging manifold 96 in this order. A heat exchanger 86 is disposed on a cooling water circulating passage. The heat recovered by the cooling water is transferred to the water circulating through the heat exchanger 86 and the hot water tank 87 and is stored in the hot water tank 87 as the hot water. The electricity generated in the PEFC is taken out by an output controller 88 from the electric output terminal 81a of the current collector 81 to be supplied to an electric power load.

MEA Member 7

Figure 6:
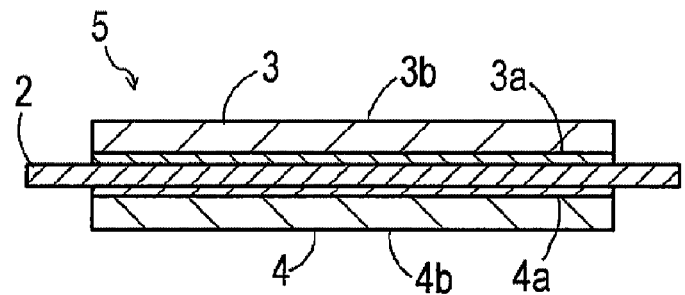
FIG. 6 is a cross-sectional view showing the structure of the MEA.

Here, the configuration of the MEA member 7 will be explained in detail. FIG. 3 is a diagram showing a main surface of the MEA member when viewed from a cathode-side. FIG. 4 is a diagram showing a main surface of the MEA member when viewed from an anode side. FIG. 5 is a cross-sectional view taken along line V-V of FIG. 3. FIG. 6 is a cross-sectional view showing the structure of the MEA.

First, the configuration of the MEA 5 that is a core of the MEA member 7 will be explained. As shown in FIGS. 3 to 6, the MEA 5 includes the polymer electrolyte membrane 2, the anode 3 stacked on a first main surface of the polymer electrolyte membrane 2, and the cathode 4 stacked on a second main surface of the polymer electrolyte membrane 2. In the present embodiment, the polymer electrolyte membrane 2 has a substantially quadrangular shape, and each of the electrode 3 of the anode 3 and the electrode 4 of the cathode 4 also has a substantially quadrangular shape. The polymer electrolyte membrane 2 is covered with the electrodes 3 and 4 except for a four-side peripheral portion thereof.

The polymer electrolyte membrane 2 is an ion-exchange membrane which is believed to selectively cause hydrogen ions to penetrate therethrough. It is preferable that the polymer electrolyte membrane 2 be a perfluoro carbon sulfonic acid membrane, such as NAFION (NAFION is a trademark of E. I. du Pont de Nemours and Company).

The anode 3 includes the catalyst layer 3a and the gas diffusion layer 3b which are stacked on each other. The catalyst layer 3a contains, as a major component, carbon powder supporting a platinum-ruthenium alloy catalyst. The gas diffusion layer 3b has gas permeability and electron conductivity. The cathode 4 includes the catalyst layer 4a and the gas diffusion layer 3b which are stacked on each other. The catalyst layer 4a contains, as a major component, carbon powder supporting a platinum catalyst. The gas diffusion layer 3b has gas permeability and electron conductivity. The MEA 5 configured as above is generally manufactured by sequentially forming the catalyst layers 3a and 4a and the gas diffusion layers 3b and 4b on the polymer electrolyte membrane 2 by application, transfer, or the like.

As shown in FIG. 6, the polymer electrolyte membrane 2 may be exposed at a peripheral portion of the MEA 5. However, in order to protect and reinforce the polymer electrolyte membrane 2 having a thin film shape, a protective membrane 71 formed by resin or elastomer may be provided as a polymer electrolyte membrane protective member. In a case where the MEA 5 includes the protective membrane 71, located on the surface of the peripheral portion of the MEA 5 is not the polymer electrolyte membrane 2 but the protective membrane 71.

Figure 7:
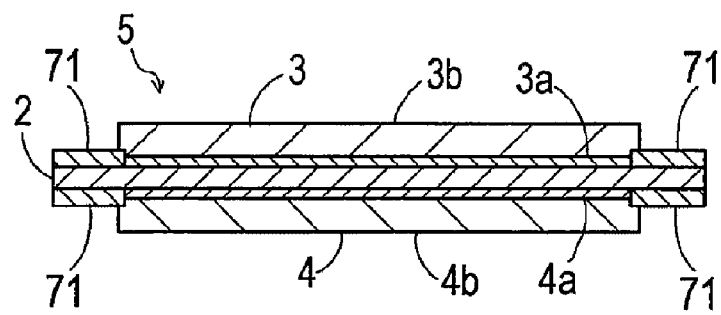
FIG. 7 is a cross-sectional view showing the structure of Alternative Version 1 of the MEA.
Figure 8:
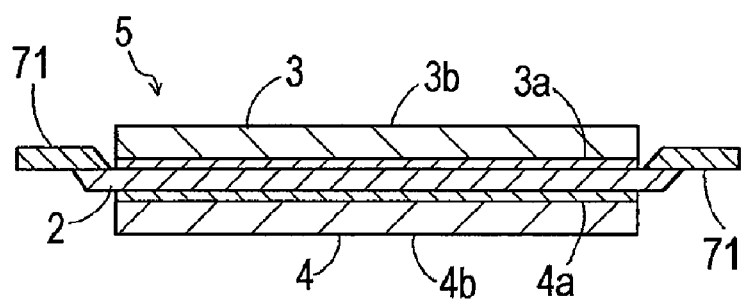
FIG. 8 is a cross-sectional view showing the structure of Alternative Version 2 of the MEA.
Figure 9:
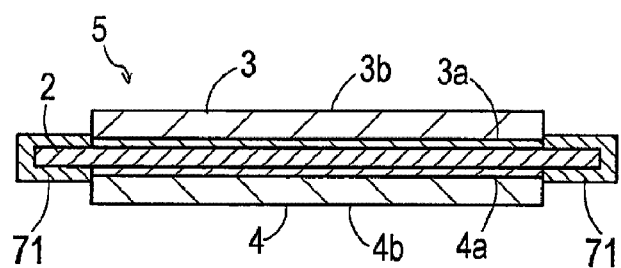
FIG. 9 is a cross-sectional view showing the structure of Alternative Version 3 of the MEA.

FIG. 7 is a cross-sectional view showing the structure of Alternative Version 1 of the MEA. FIG. 8 is a cross-sectional view showing the structure of Alternative Version 2 of the MEA. FIG. 9 is a cross-sectional view showing the structure of Alternative Version 3 of the MEA. As shown in FIG. 7 for example, when viewed from a thickness direction of the polymer electrolyte membrane 2, the protective membranes 71 may be provided so as to partially overlap peripheral portions of the electrodes 3 and 4 and cover both main surfaces of the peripheral portion of the polymer electrolyte membrane 2. Moreover, as shown in FIG. 8, the protective membrane 71 may have a substantially rectangular frame shape and may be joined to the polymer electrolyte membrane exposed between the stacked electrodes 3 and 4. Such protective membrane 71 can be formed by applying the technology described in, for example, Japanese Laid-Open Patent Application Publication No. 5-234606. Or, as shown in FIG. 9, the protective membrane 71 may completely cover the peripheral portion of the polymer electrolyte membrane 2 which portion is not covered with the electrodes 3 and 4. Such protective membrane 71 can be formed by applying the technology described in, for example, Published Japanese Translation of PCT Application No. 7-501417.

Next, the structure of the frame 6 will be explained. The frame 6 serves as both a gasket seal disposed between the separators 8 and 9 to seal the MEA 5 and a holding member configured to improve the handleability of the MEA 5.

The frame 6 is a thin plate-like substantially rectangular frame having a substantially rectangular opening 60 at a substantially center portion thereof. The MEA 5 is disposed inside the opening 60 (inside the frame). The frame 6 has a two piece structure in the thickness direction and includes a first surface member 6a contacting the anode separator 9 and a second surface member 6b contacting the cathode separator 8. The first surface member 6a and the second surface member 6b sandwich the peripheral portion of the MEA 5. Thus, the frame 6 holds the MEA 5 with the electrodes 3 and 4 exposed from the opening 60 of the frame 6.

It is desirable that at least a surface of the frame 6 which surface contacts the separator 8 or 9 be formed by an elastic member. In the present embodiment, the frame 6 is formed by a thermoplastic resin. Further, a gasket 73 is disposed on each of both main surfaces of the frame 6. When the MEA member 7 is pressed between the separators 8 and 9, the frame 6 and the gasket 73 elastically deform and stick to the separators 8 and 9. Thus, the frame 6 serves as the gasket seal configured to seal a gap between the separator 8 and the MEA 5 and between the separator 9 and the MEA 5 to prevent the leakage of the reactant gas and the cooling water to the separator 8, the separator 9, the MEA 5, or to the outside.

The gasket 73 is disposed on the frame 6 so as to prevent the cooling water and the reactant gases that are the fuel gas and the oxidizing gas from leaking from a predetermined channel. Specifically, the gasket 73 includes a manifold hole gasket 73a and an electrode gasket 73b which are formed on each of the main surfaces of the frame 6. The manifold hole gasket 73a is formed so as to surround respective manifold holes (the fuel gas supplying manifold hole 11, the fuel gas discharging manifold hole 12, the oxidizing gas supplying manifold hole 13, the oxidizing gas discharging manifold hole 14, the cooling water supplying manifold hole 15, and the cooling water discharging manifold hole 16). The electrode gasket 73b is formed so as to surround each of the electrodes 3 and 4 of the MEA 5 at an inner peripheral portion of the frame 6. In the present embodiment, the manifold hole gasket 73a and the electrode gasket 73b are seamlessly and integrally formed. However, the manifold hole gasket 73a and the electrode gasket 73b are separately called depending on the function and position of the gasket.

Figure 10:
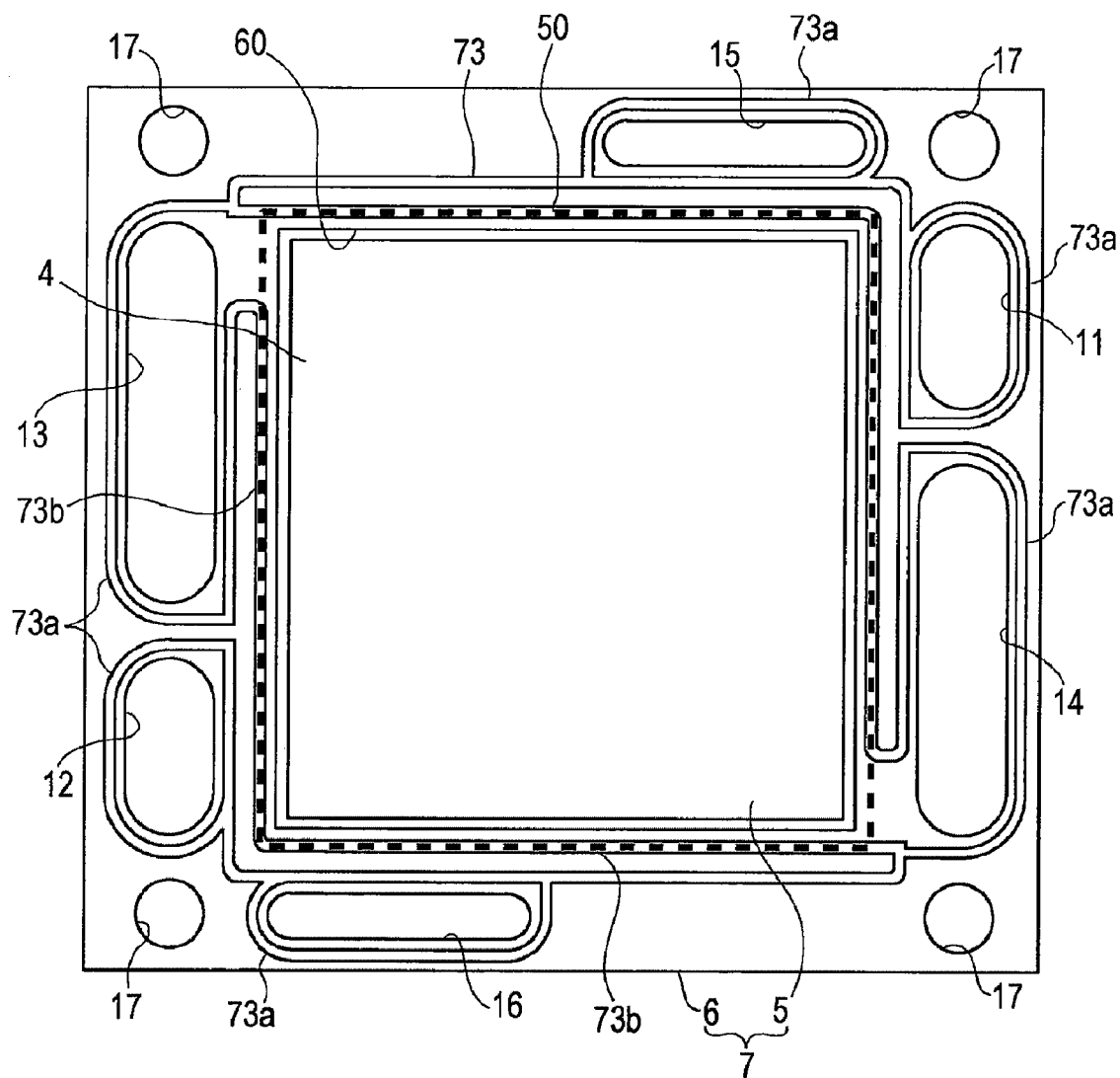
FIG. 10 is a diagram for explaining a cutoff line formed on a frame and showing a main surface of the MEA member when viewed from the cathode side.
Figure 11:
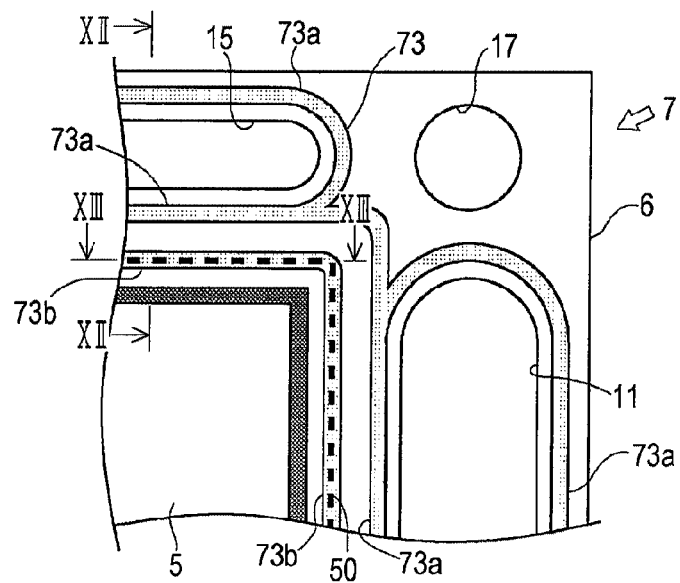
FIG. 11 is a partial view for explaining the cutoff line formed on the frame and showing the MEA member.
Figure 12:
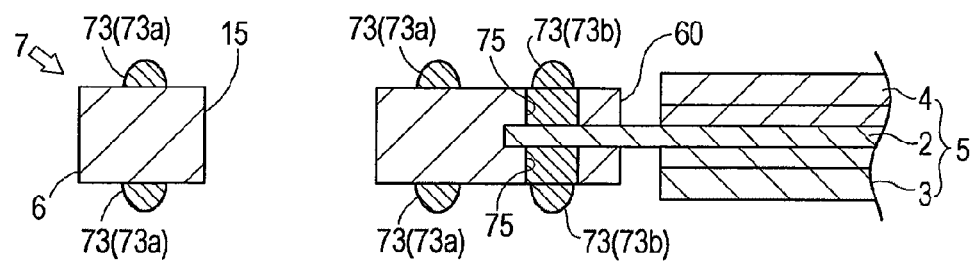
FIG. 12 is a cross-sectional view showing an end surface taken along line XII-XII of FIG. 11.
Figure 13:
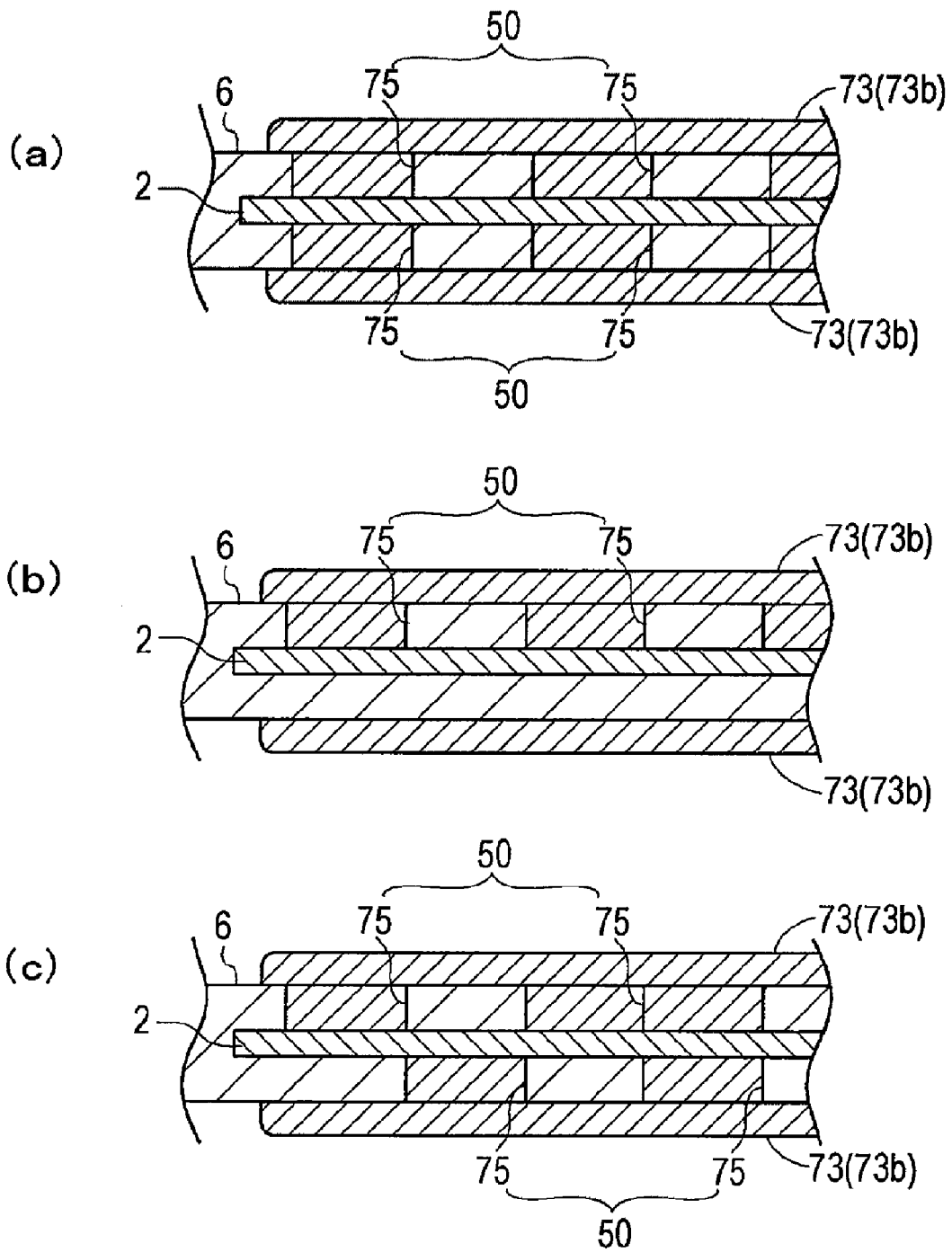
FIG. 13 is a cross-sectional view showing an end surface taken along line XIII-XIII of FIG. 11.
Figure 14:
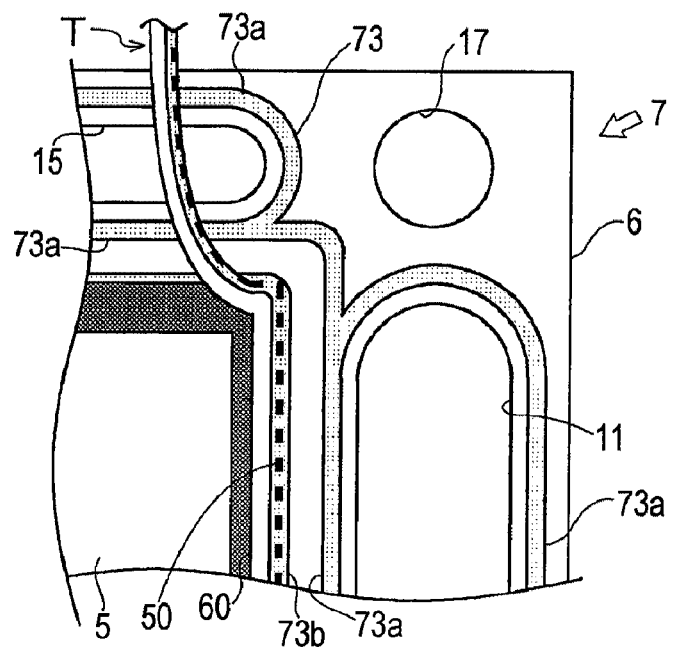
FIG. 14 is a diagram showing that a part of the frame is cut off by utilizing the cutoff line.

Further, the frame 6 includes a separating portion for separating the MEA 5 from the frame 6. Herein, the frame 6 includes a broken-line cutoff line 50 for dividing the frame 6 into two or more parts. FIG. 10 is a diagram for explaining the cutoff line formed on the frame and showing a main surface of the MEA member when viewed from the cathode side. FIG. 11 is a partial view for explaining the cutoff line formed on the frame and showing the MEA member. FIG. 12 is a cross-sectional view showing an end surface taken along line XII-XII of FIG. 11. FIG. 13 is a cross-sectional view showing an end surface taken along line XIII-XIII of FIG. 11. FIG. 14 is a diagram showing that a part of the frame is cut off by utilizing the cutoff line.

As shown in FIG. 10, the "cutoff line 50" formed on the frame 6 in the present invention is a plurality of slits drawn like a line and formed at predetermined intervals. Herein, the "slit" is a hole formed on the surface of the frame, and the hole may be a recess or a through hole. Moreover, the shape of each slit is not especially limited. For example, when viewed from the main surface side of the MEA member 7 (in the thickness direction of the polymer electrolyte membrane 2), the slit may have a rectangular shape, a diamond shape, or a circular shape. It is desirable that one end or both ends of the cutoff line 50 be connected to an inner peripheral edge or an outer peripheral edge of the frame 6. By utilizing such cutoff line 50, a part (T) of the frame 6 can be cut off as shown in FIG. 14 for example. However, one end or both ends of the cutoff line 50 do not have to be connected to the inner peripheral edge or outer peripheral edge of the frame 6 as long as a part of the frame 6 can be broken down by tearing the part of the frame 6 by utilizing the cutoff line 50. To be specific, it is desirable that the cutoff line 50 be a line capable of dividing the frame 6 into two or more parts. However, the cutoff line 50 does not have to be such a line as long as the cutoff line 50 is a line capable of breaking down a part of the frame 6.

When viewed from the main surface side of the MEA member 7 (in the thickness direction of the polymer electrolyte membrane 2), the cutoff line 50 is formed at a portion of the frame 6 at which portion the frame 6 and the peripheral portion of the MEA 5 overlap each other. The cutoff line 50 shown in FIGS. 10 and 11 is formed so as to overlap the electrode gasket 73b when viewed from the main surface side of the MEA member 7.

As shown in FIG. 12, each of the plurality of slits 75 forming the cutoff line 50 has such a depth that the peripheral portion of the MEA 5 sandwiched by the frame 6 appears at the bottom of the slit 75. To be specific, each slit 75 reaches to the peripheral portion of the MEA 5. Here, in a case where the polymer electrolyte membrane 2 is exposed at the peripheral portion of the MEA 5, the polymer electrolyte membrane 2 appears at the bottom of the slit 75. In a case where the peripheral portion of the MEA 5 is covered with the protective membrane 71, the protective membrane 71 appears at the bottom of the slit 75.

As shown in FIGS. 12 and 13(a), the plurality of slits 75 forming the cutoff line 50 are formed on both the first main surface and the second main surface of the frame 6. The slits 75 are opposed to each other with the MEA 5 interposed therebetween. However, the cutoff line 50 does not have to be formed on each of both the first main surface and the second main surface of the frame 6 and may be formed on one of the first main surface and the second main surface of the frame 6. For example, as shown in FIG. 13(b), the slits 75 forming the cutoff line 50 may be formed only on the first main surface of the frame 6 or only on the second main surface of the frame 6. By forming the cutoff lines 50 only on one surface of the frame 6, the cutoff line can be formed while suppressing a stiffness reduction of the frame 6. Moreover, the slits 75 forming the cutoff line 50 do not have to be opposed to each other via the MEA 5. For example, as shown in FIG. 13(c), the slits 75 may be alternately and consecutively formed on both the first main surface and the second main surface of the frame 6.

Since the cutoff line 50 is formed on the frame 6, the frame 6 is torn along the cutoff line 50 by holding and pulling a part of the frame 6 which part is a portion to be cut off. Therefore, a part of the frame 6 which part sandwiches the peripheral portion of the MEA 5 can be cut off or broken down. When the part of the frame 6 which part sandwiches the peripheral portion of the MEA 5 is broken down, a power applied from the frame 6 to the MEA 5 to sandwich the MEA 5 is partially or completely released. On this account, the MEA 5 is easily taken out from the frame 6. Thus, the MEA 5 and the frame 6 can be easily separated from each other without using any special tool or damaging the MEA 5.

It is desirable that when viewed from the main surface side of the MEA member 7, the cutoff line 50 be formed on a portion of the frame 6 at which portion the electrode gasket 73b is formed or on an outer peripheral side of this portion, and at the same time, be formed on a portion of the frame 6 at which portion the manifold hole gasket 73a is formed or on an inner peripheral side of this portion. In accordance with a case where the cutoff line 50 is formed at such position, by tearing the frame 6 along the cutoff line 50, a portion of the frame 6 which portion sandwiches the MEA 5 breaks down, and this directly reduces the power for holding the MEA 5. Therefore, the MEA 5 can be smoothly taken out from the frame 6.

Figure 15:
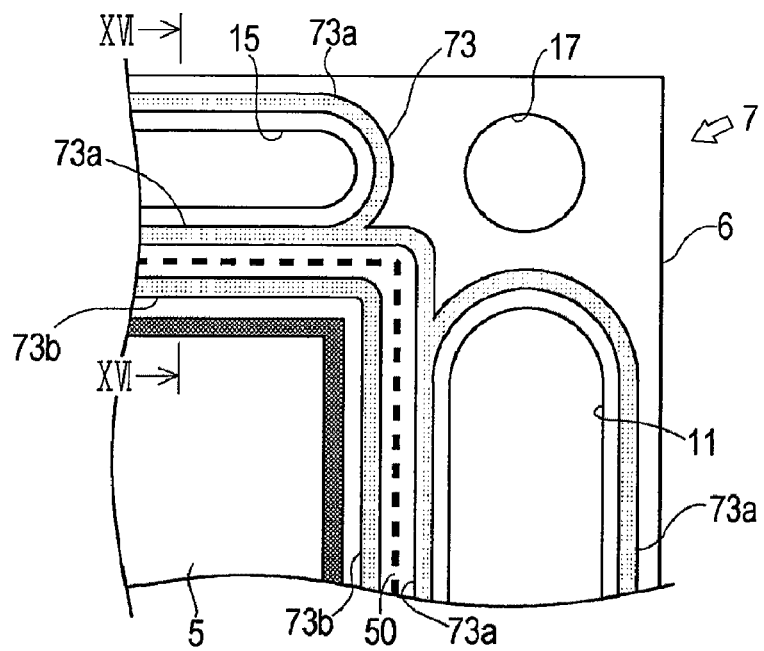
FIG. 15 is a partial view for explaining Modification Example 1 of the cutoff line formed on the frame and showing the MEA member.
Figure 16:
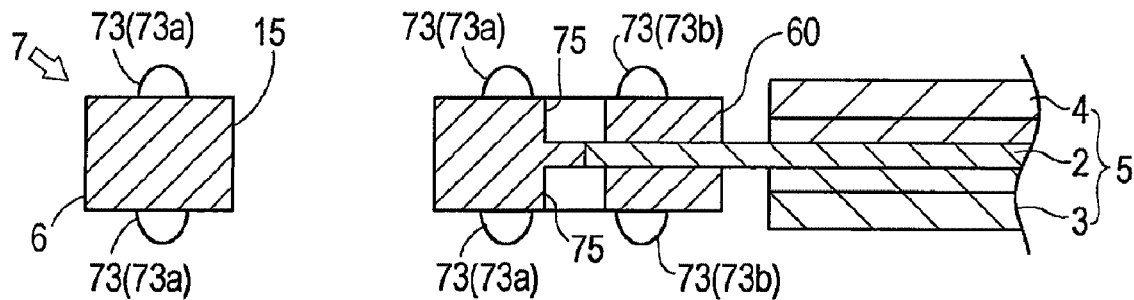
FIG. 16 is a cross-sectional view showing an end surface taken along line XVI-XVI of FIG. 15.
Figure 17:
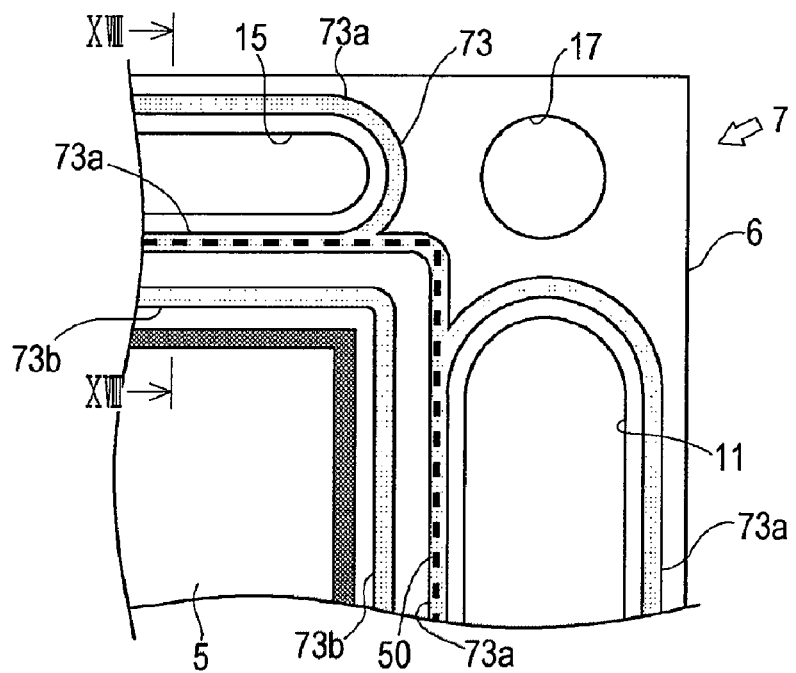
FIG. 17 is a partial view for explaining Modification Example 2 of the cutoff line formed on the frame and showing the MEA member.
Figure 18:
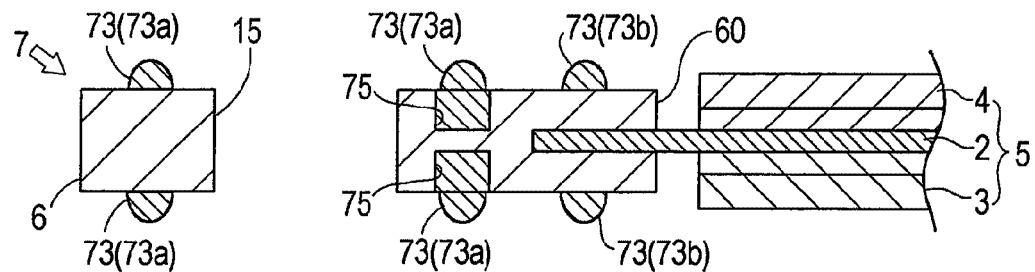
FIG. 18 is a cross-sectional view showing an end surface taken along line XVIII-XVIII of FIG. 17.

FIG. 15 is a partial view for explaining Modification Example 1 of the cutoff line formed on the frame and showing the MEA member. FIG. 16 is a cross-sectional view showing an end surface taken along line XVI-XVI of FIG. 15. FIG. 17 is a partial view for explaining Modification Example 2 of the cutoff line formed on the frame and showing the MEA member. FIG. 18 is a cross-sectional view showing an end surface taken along line XVIII-XVIII of FIG. 17. For example, when viewed from the main surface side of the MEA member 7, the cutoff line 50 shown in FIGS. 15 and 16 is formed at a portion sandwiched between the manifold hole gasket 73a and the electrode gasket 73b of the frame 6. Moreover, for example, when viewed from the main surface side of the MEA member 7, the cutoff line 50 shown in FIGS. 17 and 18 is formed at a portion overlapping the manifold hole gasket 73a of the frame 6.

As shown in FIGS. 12 and 18, in a case where the cutoff line 50 overlaps the gasket 73 when viewed from the main surface side of the MEA member 7, the slits can be filled up with a gasket material. By a part of the gasket 73 having flowed into the slits, the improvement of adherence between the frame 6 and the gasket 73 can be expected. In some cases, when forming the gasket 73 the frame 6, grooves for holding the gasket 73 are formed on the frame 6. Herein, the cutoff line 50 may be used as these grooves.

Figure 19:
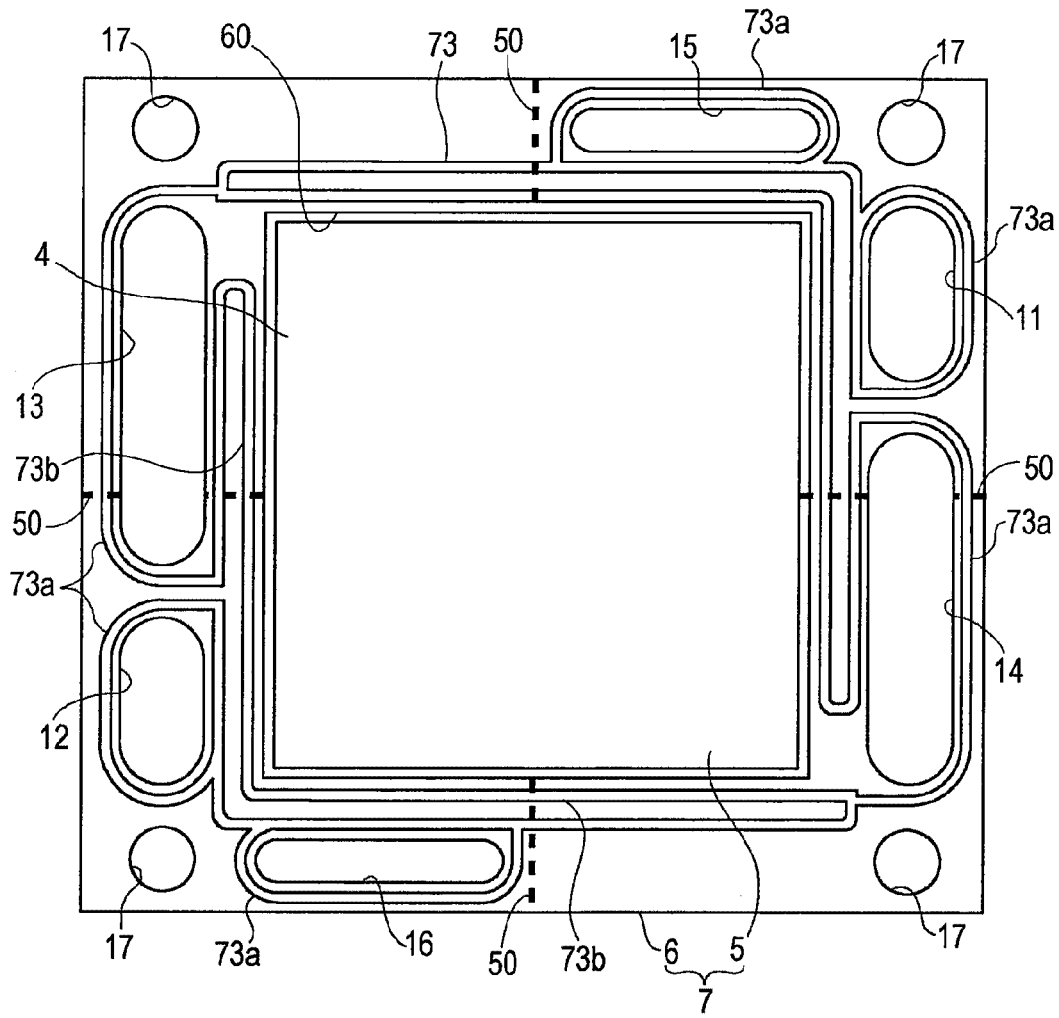
FIG. 19 is a diagram for explaining Modification Example 3 of the cutoff line formed on the frame and showing a main surface of the MEA member when viewed from the cathode side.

The cutoff line 50 is formed on the frame 6 so as to have a circular shape and surround the electrode 3 or 4 of the MEA 5. However, the cutoff line 50 does not have to have the circular shape. FIG. 19 is a diagram for explaining Modification Example 3 of the cutoff line formed on the frame and showing a main surface of the MEA member when viewed from the cathode side. For example, as shown in FIG. 19, the cutoff line 50 may be a line connecting the inner peripheral edge and the outer peripheral edge of the frame 6.

Method for Forming Frame

Figure 20:
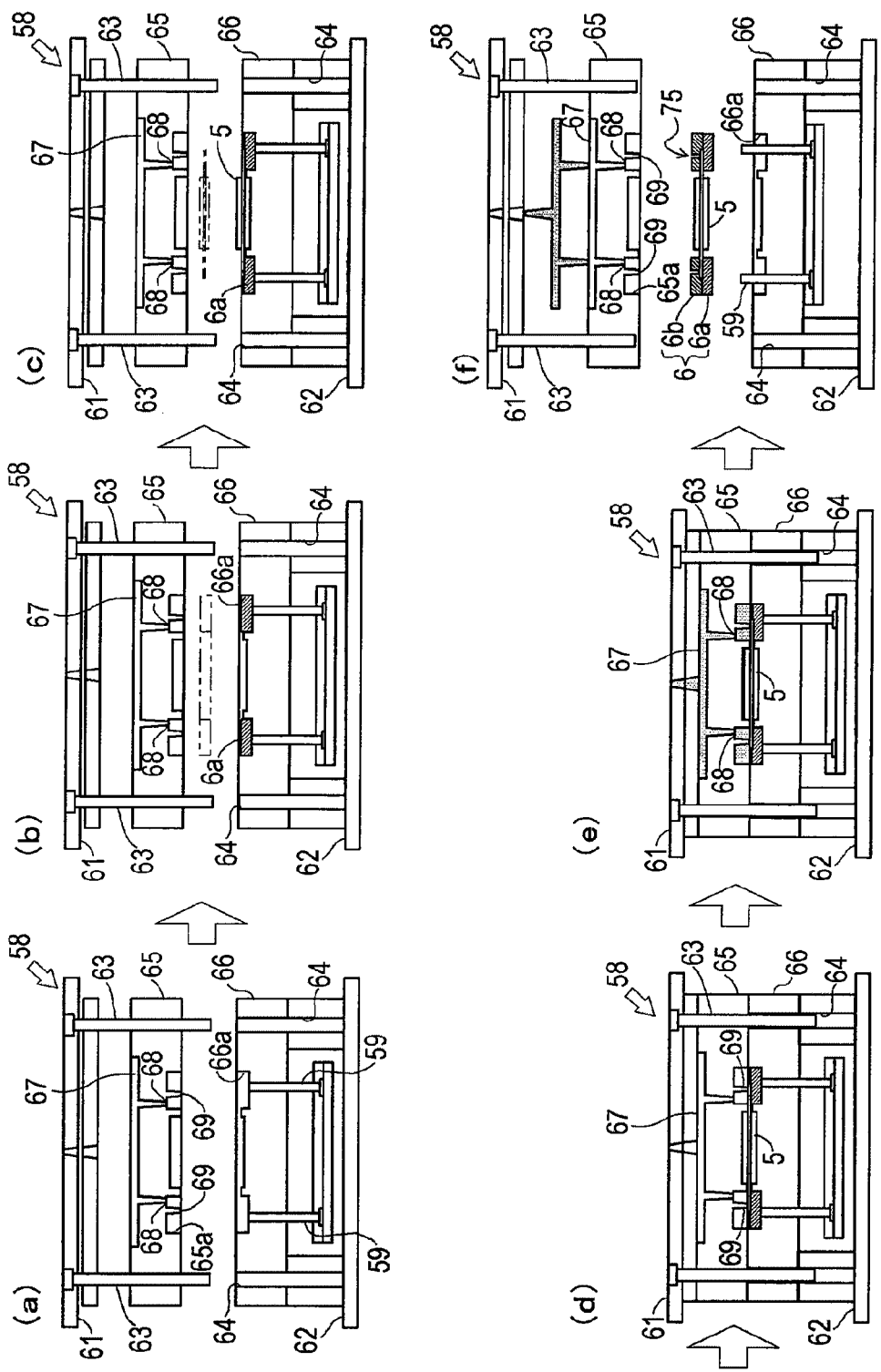
FIG. 20 are diagrams for explaining a step of forming the frame.

Next, a method for forming on the MEA 5 the frame 6 including the cutoff line 50 by injection molding will be explained. FIG. 20 are diagrams for explaining a step of forming the frame.

As shown in FIG. 20(a), a mold 58 configured to form the frame 6 includes a fixed portion 62 and a movable portion 61. The movable portion 61 is attached to a molding machine, not shown, and capable of moving forward and backward with respect to the fixed portion 62. The movable portion 61 has guide pins 63, and the fixed portion 62 has guide pin bushes 64. Since the guide pin 63 is inserted into and guided by the guide pin bush 64, the movable portion 61 can move forward and backward in a predetermined direction with respect to the fixed portion 62. A cavity plate 66 to which a first molding portion (not shown) having a shaped surface 66a corresponding to a molded product is fixed is attached to the fixed portion 62. A core plate 65 to which a second molding portion (not shown) having a shaped surface 65a corresponding to a molded product is fixed is attached to the movable portion 61. By joining the cavity plate 66 and the core plate 65 each other, a cavity surrounded by the shaped surfaces 66a and 65a is formed between the cavity plate 66 and the core plate 65. Moreover, the core plate 65 has a runner 67 and a gate 68, each of which is a passage through which a material resin flows. Moreover, the fixed portion 62 has an ejector pin 59 for taking out the molded product on the shaped surface of the cavity plate 66.

The first surface member 6a of the frame 6 is preformed to explain the method for forming the frame 6 using the mold 58 configured as above. The method for forming the first surface member 6a is not limited to the injection molding but may be the other method.

First, as show in FIG. 20(b), the first surface member 6a is mounted at a predetermined position of the shaped surface 66a of the cavity plate 66. Next, as shown in FIG. 20(c), the MEA 5 is mounted on the first surface member 6a on the shaped surface 66a of the cavity plate 66 such that the peripheral portion of the MEA 5 contacts the first surface member 6a. Then, as shown in FIG. 20(d), the movable portion 61 moves toward the fixed portion 62 to carry out mold clamping. Here, the core plate 65 contacts and presses the cavity plate 66, and the cavity is therefore formed between the cavity plate 66 and the core plate 65.

In the above-described mold clamping, the peripheral portion of the MEA 5 held by the cavity is sandwiched between and fixed by a pressing portion 69 formed at the shaped surface 65a of the core plate 65 and the shaped surface 66a of the cavity plate 66. The pressing portions 69 are convex portions provided to form a plurality of slits 75 forming the cutoff line 50. In this state, a high temperature and pressure material resin is injected into the cavity. Since a part of the peripheral portion of the MEA 5 is pressed and fixed by the pressing portion 69 in the cavity, floating and curling are suppressed.

As shown in FIG. 20(e), in the mold 58 during the mold clamping, the material resin is injected into the runner 67. The material resin flows through the runner 67 and the gate 68 to the cavity. Thus, the cavity is filled up with the material resin. As shown in FIG. 20(f), after a die time has elapsed, the movable portion 61 moves away from the fixed portion 62 to open the mold. Further, the molded product is released from the mold by the ejector pin 59. Thus, the molded product is taken out from the mold 58.

Thus, the MEA member 7 configured such that the peripheral portion of the MEA 5 is sandwiched between the first surface member 6a and the second surface member 6b of the frame 6 is formed by the above injection molding step. Here, holes are formed on the second surface member 6b by the pressing portions 69 of the shaped surface 65a so as to penetrate to the surface of the MEA 5. The holes become the slits 75 forming the cutoff line 50.

Embodiment 2

Figure 21:
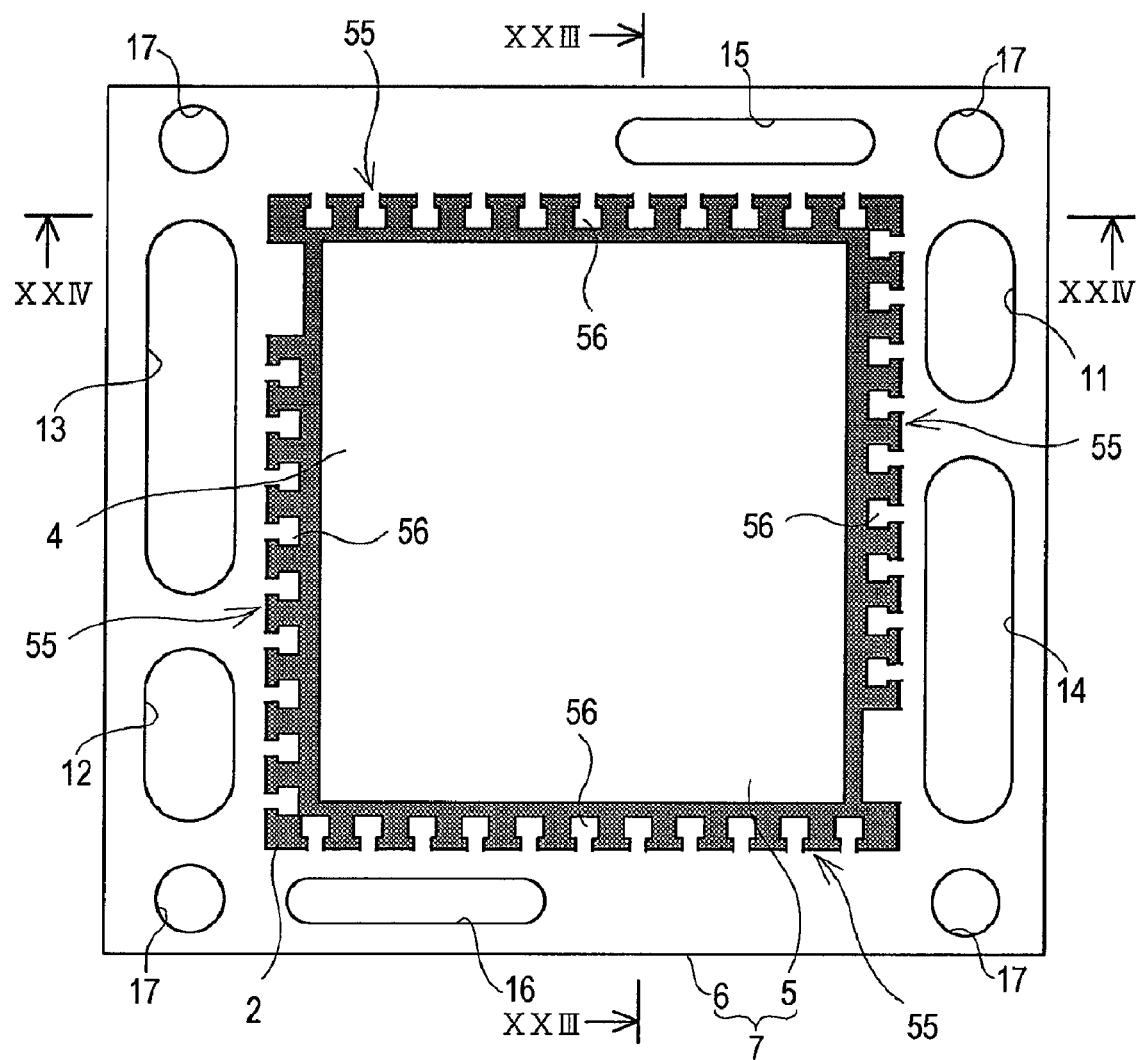
FIG. 21 is a diagram for explaining a partial sandwiching portion formed on the frame and showing a main surface of the MEA member when viewed from the cathode side.
Figure 22:
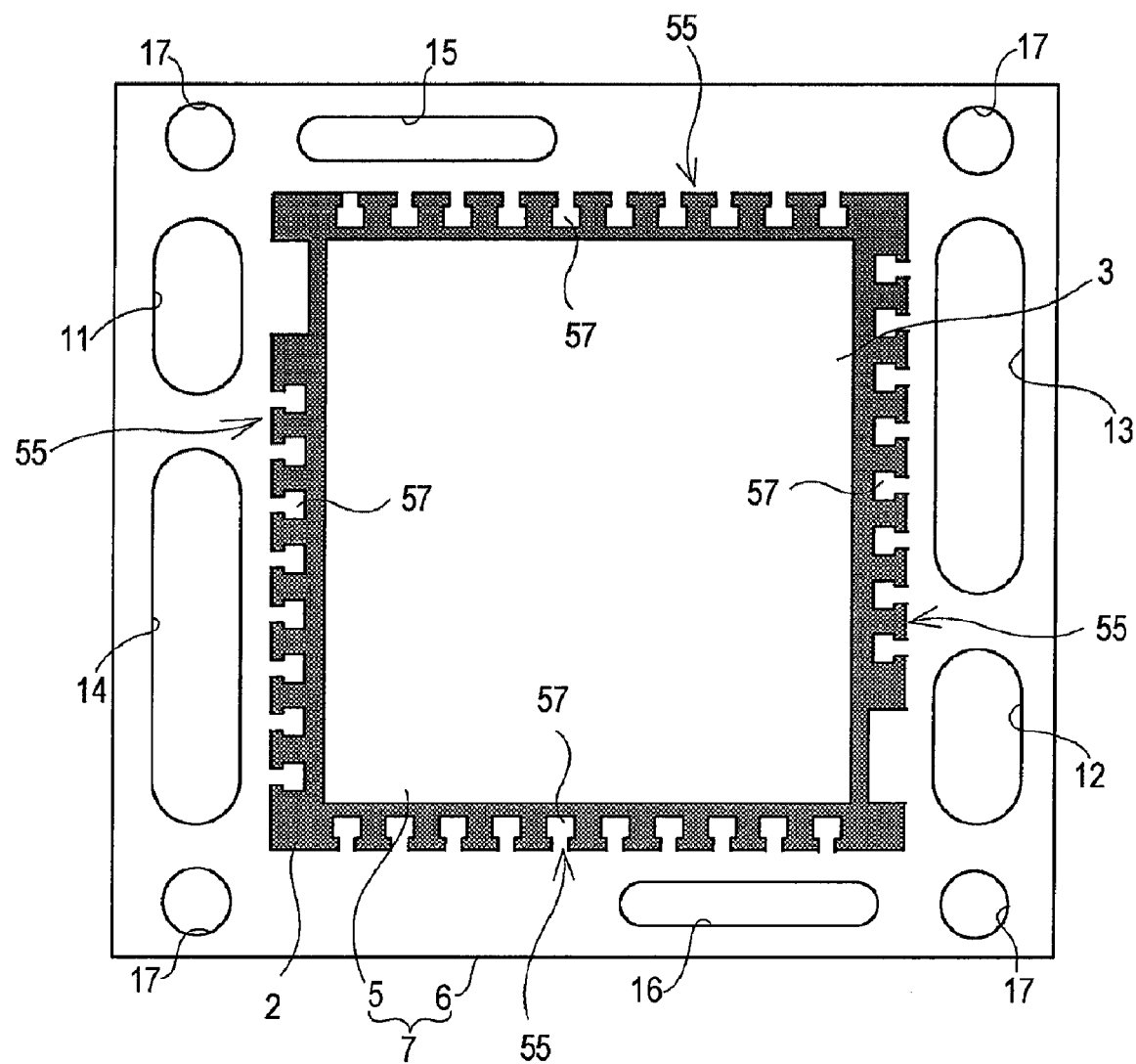
FIG. 22 is a diagram for explaining the partial sandwiching portion formed on the frame and showing a main surface of the MEA member when viewed from the anode side.
Figure 23:
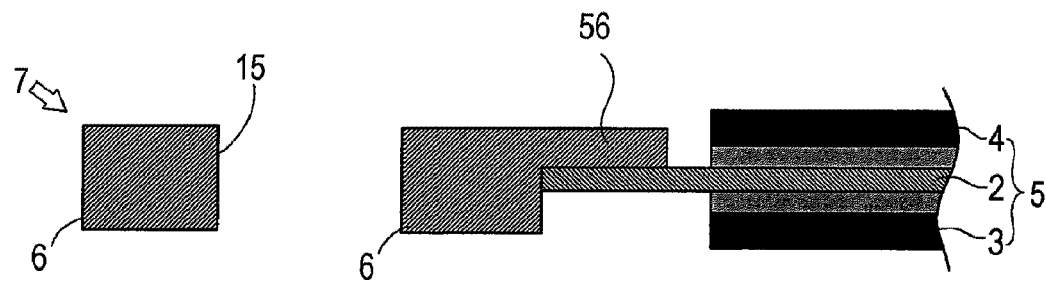
FIG. 23 is a cross-sectional view showing an end surface taken along line XXIII-XXIII of FIG. 21.
Figure 24:
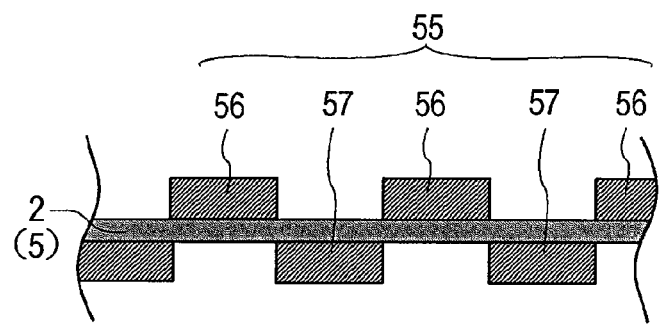
FIG. 24 is a cross-sectional view showing an end surface taken along line XXIV-XXIV of FIG. 21.

Next, the MEA member (framed membrane-electrode assembly) according to Embodiment 2 of the present invention will be explained in reference to FIGS. 21 to 24. Since the PEFC (polymer electrolyte fuel cell) according to Embodiment 2 is the same in configuration as the PEFC according to Embodiment 1 except for the MEA member, an explanation of the PEFC according to Embodiment 2 will be omitted. FIG. 21 is a diagram showing a main surface of the MEA member according to Embodiment 2 when viewed from the cathode side. FIG. 22 is a diagram showing a main surface of the MEA member according to Embodiment 2 when viewed from the anode side. FIG. 23 is a cross-sectional view showing an end surface taken along line XXIII-XXIII of FIG. 21. FIG. 24 is a cross-sectional view showing an end surface taken along line XXIV-XXIV of FIG. 21. In these drawings, the gasket 73 shown in, for example, FIG. 10 is not shown.

As shown in FIG. 21, the MEA member 7 according to Embodiment 2 includes the MEA 5, the frame 6, and the separating portion. In this regard, the MEA member 7 according to Embodiment 2 is common to the MEA member according to Embodiment 1. However, the MEA member according to Embodiment 1 and the MEA member 7 according to Embodiment 2 are different in configuration from each other in that the separating portion is the cutoff line 50 in the MEA member 7 according to Embodiment 1 whereas the separating portion is a partial sandwiching portion 55 in the MEA member 7 according to Embodiment 2. Hereinafter, the configuration of the separating portion (partial sandwiching portion 55), which is different from that of Embodiment 1, in the configuration of the MEA member 7 according to Embodiment 2 will be explained.

As described above, the separating portion is the partial sandwiching portion 55 in Embodiment 2. As shown in FIGS. 21 and 22, the partial sandwiching portion 55 is formed at the inner peripheral portion of the frame 6 and configured to partially sandwich the peripheral portion of the MEA 5. Herein, the phrase "partially sandwich" denotes that a case where the peripheral portion of the MEA 5 is entirely sandwiched is omitted. A case where the peripheral portion of the MEA 5 is partially sandwiched but partially not sandwiched corresponds to the phrase "partially sandwich".

Moreover, the partial sandwiching portion 55 is mainly constituted by first projections 56 shown in FIG. 21 and second projections 57 shown in FIG. 22.

As shown in FIG. 21, a plurality of first projections 56 are formed along the entire inner peripheral portion of the frame 6. Each first projection 56 projects inwardly from the inner peripheral portion of the frame 6. The first projections 56 are continuously formed at predetermined intervals. The first projection 56 has such a T shape that a tip end portion thereof is wider than a base end portion thereof, and the base end thereof coincides with an outer edge of the MEA 5 (see FIG. 23). As shown in FIG. 24, the first projection 56 is formed on a portion of the frame which portion is located on the cathode side of the MEA (on an upper side in the sheet of FIG. 24). The wide rectangular first projection 56 is formed in the vicinity of each of the oxidizing gas supplying manifold hole 13 and the oxidizing gas discharging manifold hole 14. This is to prevent the first projection 56 from becoming an obstacle of the flow of the oxidizing gas from the oxidizing gas supplying manifold hole 13 to the oxidizing gas discharging manifold hole 14.

As shown in FIG. 22, a plurality of second projections 57 are formed along the entire inner peripheral portion of the frame 6. Each second projection 57 projects inwardly from the inner peripheral portion of the frame 6. The second projections 57 are continuously formed at predetermined intervals. The second projection 57 has such a T shape that a tip end portion thereof is wider than a base end portion thereof, and the base end thereof coincides with an outer edge of the MEA 5. As shown in FIG. 24, the second projection 57 is formed on a portion of the frame 6 which portion is located on the anode side of the MEA 5 (on a lower side in the sheet of FIG. 24). The wide rectangular second projection 57 is formed in the vicinity of each of the fuel gas supplying manifold hole 11 and the fuel gas discharging manifold hole 12. This is to prevent the second projection 57 from becoming an obstacle of the flow of the fuel gas from the fuel gas supplying manifold hole 11 to the fuel gas discharging manifold hole 12.

As shown in FIG. 24, the first projections 56 and the second projections 57 are alternately provided along the peripheral portion of the MEA 5 (polymer electrolyte membrane 2) (in a circumferential direction of the frame 6). Strictly speaking, when viewed from the main surface side of the MEA member 7, the first projections 56 and the second projections 57 are alternately provided and formed such that a side edge portion of the first projection 56 and a side edge portion of the second projection 57 overlap each other. As above, although the MEA 5 is sandwiched between the first projection 56 and the second projection 57, the peripheral portion of the MEA 5 does not "entirely" contact the first projection 56 or the second projection 57. To be specific, the peripheral portion of the MEA 5 is "partially" sandwiched between the first projection 56 and the second projection 57. FIG. 24 shows that the polymer electrolyte membrane 2 of the MEA 5 is directly sandwiched between the first projection 56 and the second projection 57. However, in a case where the peripheral portion of the MEA 5 is covered with the protective membrane 71 as shown in FIGS. 7 to 9, the first projection 56 and the second projection 57 sandwich the MEA 5 via the protective membrane 71.

As above, in Embodiment 2, the MEA 5 is partially sandwiched between the first projection 56 and the second projection 57. However, from a broad point of view, the entire peripheral portion of the MEA 5 is sandwiched therebetween. Therefore, the movement of the MEA 5 in the thickness direction is surely limited. Moreover, since the MEA 5 is partially sandwiched therebetween, the area of a sandwiched portion of the MAE 5 becomes smaller than a case where the peripheral portion of the MEA 5 is entirely sandwiched, so that the MEA 5 can be easily pulled out in a direction perpendicular to the thickness direction. Especially, this effect is significant in a case where the first projections 56 and the second projections 57 are alternately provided. Therefore, for example, in the case of bending the entire MEA member 7 to pull out the MEA 5 from the frame 6 (partial sandwiching portion 55), the MEA 5 can be easily taken out from the frame 6.

The foregoing has explained the configuration of the MEA member 7 according to Embodiment 2, especially the configuration of separating portion (partial sandwiching portion 55). In a case where the MEA member 7 according to Embodiment 2 adopts the two piece structure as with the MEA member 7 according to Embodiment 1, it can be manufactured by the injection molding step shown in FIG. 20. To be specific, the first surface member 6a corresponding to an anode side portion (including the second projection 57) of the frame 6 is manufactured in advance (see FIG. 20(b)), the MEA 5 is mounted on the first surface member 6a (see FIG. 20(c)), and the second surface member 6b corresponding to a cathode side portion (including the first projection 56) of the frame 6 is further formed on the MEA 5 by the injection molding (see FIGS. 20(d) and 20(e)). With this, the MEA member 7 is formed such that the peripheral portion of the MEA 5 is sandwiched between the first surface member 6a and the second surface member 6b of the frame 6 (between the first projection 56 and the second projection 57).

Figure 25:
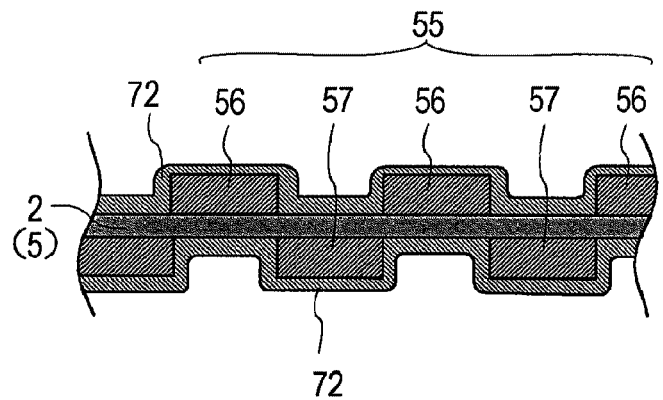
FIG. 25 is a cross-sectional view showing the structure of Alternative Version of the MEA member.

As shown in FIG. 25, it is desirable that the entire inner peripheral portion of the frame 6 be covered with a thin film 72 made of resin or elastomer. Herein, the "entire inner peripheral portion" is a region including: the first projections 56; a part of the peripheral portion of the MEA 5 which part can be seen between the first projections 56; the second projections 57; and a part of the peripheral portion of the MEA 5 which part can be seen between the second projections 57. The thin film 72 can fill the gap between the MEA 5 and the frame 6, prevent the first projection 56 and the second projection 57 from breaking while in use, and prevent the MEA 5 from oscillating in the frame 6. When detaching the MEA 5 from the frame 6, the thin film 72 needs to be removed at first. However, since the thin film 72 can be easily removed, this is not a heavy workload.

Moreover, the foregoing has explained a case where each of the first projection 56 and the second projection 57 has the T shape. However, the shape of each of the first projection 56 and the second projection 57 is not limited to this. For example, each of the first projection 56 and the second projection 57 may be formed to have a rectangular shape having a constant width from a base end to a tip end thereof. However, in a case where each of the first projection 56 and the second projection 57 has the T shape, the materials can be reduced as compared to the case where each of the first projection 56 and the second projection 57 has the rectangular shape.

Moreover, the foregoing has explained a case where the first projections 56 and the second projections 57 are alternately provided in the circumferential direction of the frame 6. However, the first projections 56 and the second projections 57 do not have to be alternately provided. The first projection 56 and the second projection 57 may entirely or partially overlap each other when viewed from the main surface side of the MEA member 7.

Moreover, the foregoing has explained a case where the base end of each of the first projection 56 and the second projection 57 coincides with the outer edge of the MEA 5. However, the base end of each of the first projection 56 and the second projection 57 may be located on an inner side of the outer edge of the MEA 5. To be specific, the peripheral portion of the MEA 5 may get in an inner portion of the frame 6 as compared to the case shown in FIG. 23. In accordance with this configuration, it is possible to prevent the formation of the gap between the MEA 5 and the frame 6.

The foregoing has explained Embodiments 1 and 2 according to the present invention in reference to the drawings. However, specific configurations are not limited to these embodiments, and design modifications and the like within the scope of the present invention are included in the present invention.

INDUSTRIAL APPLICABILITY

The present invention is widely applicable as the MEA member configured such that the MEA can be separated and recovered from the frame, in the MEA member including the polymer electrolyte membrane-electrode assembly (MEA) and the frame and in the polymer electrolyte fuel cell including the MEA member.

REFERENCE SIGNS LIST 2 polymer electrolyte membrane
3 anode
4 cathode
5 MEA (membrane-electrode assembly)
6 frame
7 MEA member
8 cathode separator
9 anode separator
10 single cell
11 fuel gas supplying manifold hole
12 fuel gas discharging manifold hole
13 oxidizing gas supplying manifold hole
14 oxidizing gas discharging manifold hole
15 cooling water supplying manifold hole
16 cooling water discharging manifold hole
17 bolt hole
50 cutoff line
55 partial sandwiching portion
56 first projection
57 second projection
72 thin film
73 gasket
73a manifold hole gasket
73b electrode gasket
75 slit

The invention claimed is:

1. An MEA member comprising:
an MEA including a polymer electrolyte membrane and a pair of electrodes respectively disposed on both main surfaces of the polymer electrolyte membrane;
a plate-shaped resin frame configured to sandwich and hold a peripheral portion of main surfaces of the MEA from both sides of the MEA such that the MEA is located inside the frame; and
a separating portion configured to separate the MEA from the frame, wherein
the separating portion includes a plurality of slits which are linearly aligned and formed on the frame to divide the frame into two or more parts, and
wherein when viewed from the thickness direction of the polymer electrolyte membrane, the plurality of slits are formed at a portion of the frame at which portion the frame and the peripheral portion of the MEA overlap each other and each of the plurality of slits reaches the peripheral portion of the MEA.

2. The MEA member according to claim 1, wherein:
the frame includes a manifold hole penetrating therethrough in a thickness direction of the polymer electrolyte membrane, a manifold hole gasket disposed on the frame to surround the manifold hole, and an electrode gasket disposed on the frame to surround the electrode; and
when viewed from the thickness direction of the polymer electrolyte membrane, the separating portion is arranged to overlap the electrode gasket or is arranged on an outer peripheral side of the electrode gasket, and at the same time, is arranged on an inner peripheral side of the manifold hole gasket.

3. The MEA member according to claim 1, wherein at least a part of the plurality of slits are filled up with the electrode gasket or the manifold hole gasket.

4. The MEA member according to claim 1, wherein the plurality of slits are alternately and consecutively formed on a first main surface and a second main surface of the frame.

5. The MEA member according to claim 1, wherein the plurality of slits are formed on one of a first main surface and a second main surface of the frame.

6. The MEA member according to claim 1, wherein the plurality of slits are formed on both a first main surface and a second main surface of the frame such that the slit on the first main surface and the slit on the second main surface are opposed to each other with the peripheral portion of the MEA interposed therebetween.

7. The MEA member according to claim 1, wherein:
the polymer electrolyte membrane is exposed at the peripheral portion of the MEA; and
the frame and the polymer electrolyte membrane contact each other at the peripheral portion of the MEA.

8. The MEA member according to claim 1, wherein:
a membrane reinforcing member is disposed at a peripheral portion of the polymer electrolyte membrane; and
the frame and the membrane reinforcing member contact each other at the peripheral portion of the MEA.

9. A polymer electrolyte fuel cell comprising:
the MEA member according to claim 1; and
a pair of separators respectively stacked on both surfaces of the MEA member so as to sandwich the MEA member, a reaction gas channel being formed on a region of each of the separators which region contacts the electrode.

* * * * *